United States Patent
Tobiason

(10) Patent No.: US 7,126,696 B2
(45) Date of Patent: Oct. 24, 2006

(54) INTERFEROMETRIC MINIATURE GRATING ENCODER READHEAD USING FIBER OPTIC RECEIVER CHANNELS

(75) Inventor: Joseph D. Tobiason, Woodinville, WA (US)

(73) Assignee: Mitutoyo Corporation, Kawasaki (JP)

( * ) Notice: Subject to any disclaimer, the term of this patent is extended or adjusted under 35 U.S.C. 154(b) by 234 days.

(21) Appl. No.: 10/674,619

(22) Filed: Sep. 30, 2003

(65) Prior Publication Data

US 2005/0068539 A1 Mar. 31, 2005

(51) Int. Cl.
*G01B 9/02* (2006.01)
*G01D 5/38* (2006.01)

(52) U.S. Cl. .............. 356/499; 250/231.16; 250/237 R
(58) Field of Classification Search ................ 356/499, 356/498; 250/231.16, 237 R, 231.13
See application file for complete search history.

(56) References Cited

U.S. PATENT DOCUMENTS

| | | | |
|---|---|---|---|
| 4,291,976 A | | 9/1981 | McMahon |
| 4,733,071 A | * | 3/1988 | Tokunaga .............. 250/231.16 |
| 5,486,923 A | | 1/1996 | Mitchell et al. |
| 5,808,730 A | | 9/1998 | Danielian et al. |
| 5,909,283 A | | 6/1999 | Eselun |
| 6,906,315 B1 | * | 6/2005 | Tobiason ................ 250/237 R |

FOREIGN PATENT DOCUMENTS

| | | |
|---|---|---|
| EP | 1 382 941 A1 | 1/2004 |
| JP | 59173713 | 10/1984 |
| JP | 1272917 | 10/1989 |

\* cited by examiner

*Primary Examiner*—Gregory J. Toatley, Jr.
*Assistant Examiner*—Marissa J Detschel
(74) *Attorney, Agent, or Firm*—Christensen O'Connor Johnson Kindness PLLC

(57) ABSTRACT

An interferometric fiber optic encoder readhead for sensing the displacement of a scale grating is disclosed. The detector channels of the readhead are fiber optic detector channels having respective phase grating masks. The fiber optic encoder readhead is configured to detect the displacement of interference fringes arising from the scale grating. In various exemplary embodiments, the fiber optic readhead is constructed and operably positioned according to various design relationships that insure a compact mounting and a relatively ideal sinusoidal signal as a function of displacement. Accordingly, high levels of displacement signal interpolation may be achieved, allowing sub-micrometer displacement measurements. The fiber optic encoder readhead may be assembled in a particularly accurate and economical manner and may be provided in a package with dimensions on the order of 1–2 millimeters.

31 Claims, 14 Drawing Sheets

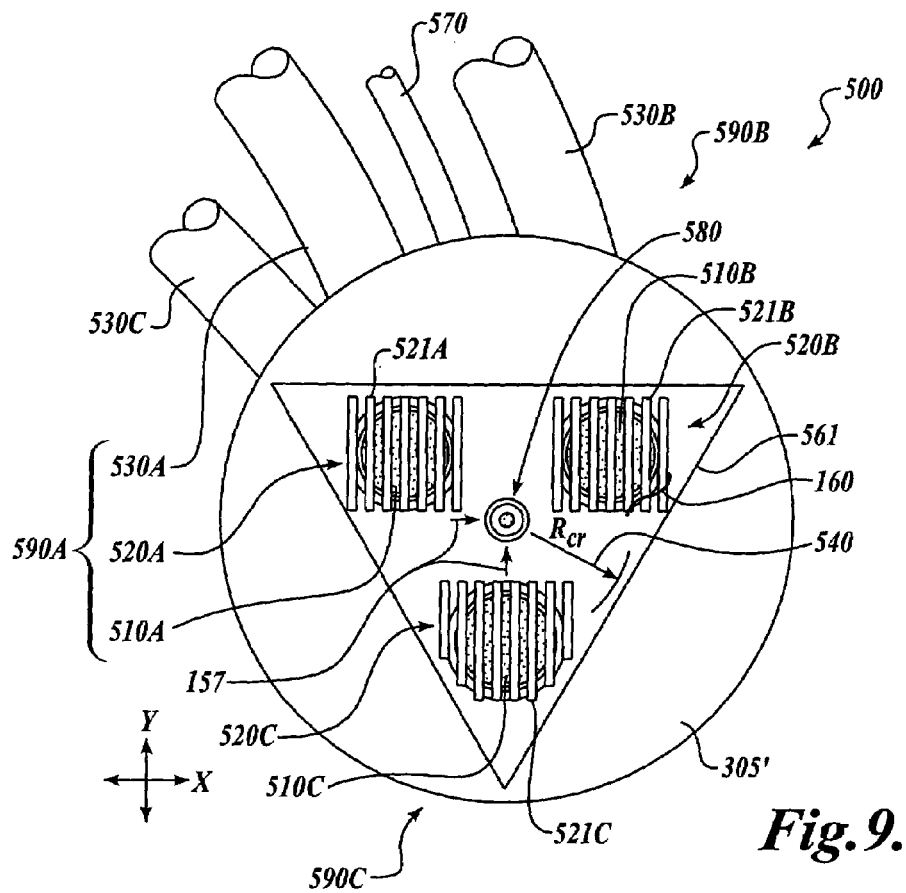
Fig. 9.
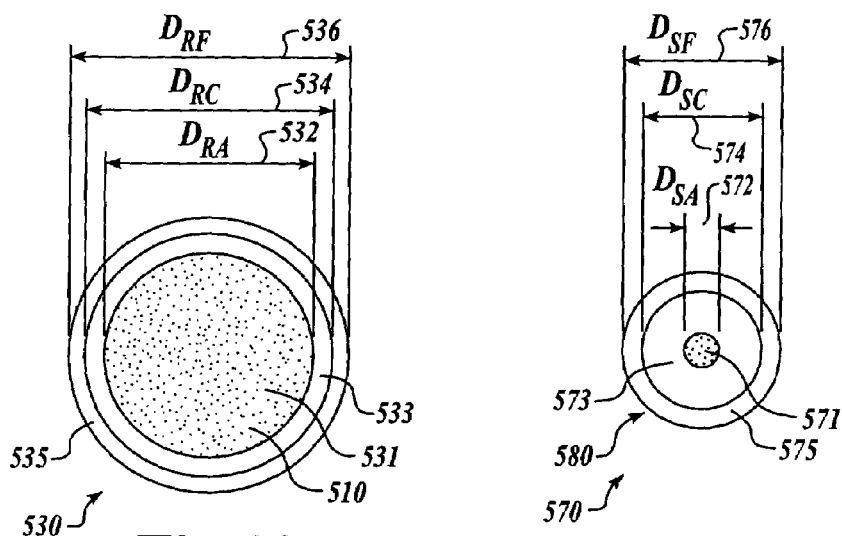
Fig. 10.          Fig. 11.

INTERFEROMETRIC MINIATURE GRATING ENCODER READHEAD USING FIBER OPTIC RECEIVER CHANNELS

FIELD OF THE INVENTION

This invention relates generally to displacement sensing optical encoders, and more particularly to an optical encoder utilizing optical fibers as receiver elements to provide an ultra-compact high accuracy system.

BACKGROUND OF THE INVENTION

Various movement or position encoders for sensing linear, rotary or angular movement are currently available. These encoders are generally based on either optical systems, magnetic scales, inductive transducers, or capacitive transducers.

For optical encoders, a number of systems have been developed. One recent system that is compact and utilizes fewer parts than most previous systems is disclosed in U.S. Pat. No. 5,909,283, to Eselun. The system described in the '283 patent has a grating scale and readhead including a point source (laser diode in readhead), a Ronchi grating or holographic element, and a photodetector array. As described, the point source results in interference fringes having a spacing equal to that of the scale. The interference fringe light is transmitted through the Ronchi grating or holographic element to the photodetector array. The photodetector array is arranged to derive four channels of quadrature signals from the transmitted fringe light. However, the resulting encoder is still of a size that is relatively large or prohibitive for a number of applications.

One very compact system utilizing optical fibers as receivers is disclosed in U.S. Pat. No. 4,733,071, to Tokunaga. The system described in the '071 patent has a code member scale, and an optical sensor head comprising an optical fiber tip light emitter and two optical fiber tip receptors closely arranged along the code member measuring axis. The optical sensor head is rotated (yawed) to adjust phase difference between the two optical fiber tip receptors. However, the accuracy of the resulting encoder is relatively crude. Another optical encoder utilizing optical fibers as receivers is disclosed in U.S. Pat. No. 4,291,976 to McMahon. The system described in the '976 patent includes optical fibers with striped ends positioned opposite relatively movable coded channel patterns, permitting the detection of motions that are comparable to the stripe width rather than the fiber diameter. However, the accuracy and resolution of the resulting encoder is still relatively crude compared to that provided by an interferometric-type encoder, and compared to that needed for a number of applications.

In various applications, it is desirable to use a so-called interferometric-type optical encoder, in order to achieve high resolution and accuracy. However, known interferometric-type optical encoders are not sufficiently compact for a number of applications, or they employ electronic detectors that limit the possible output frequency and motion speeds, or both.

SUMMARY OF THE INVENTION

The present invention is directed to providing an encoder that overcomes the foregoing and other disadvantages. More specifically, the present invention is directed to an interferometric optical encoder that is of extremely small size while providing very high accuracy, in addition to having a number of other desirable features.

A high-resolution interferometric fiber optic encoder readhead for sensing the displacement of a scale grating is disclosed. Such an interferometric-type fiber optic encoder has certain advantages over previously known encoders. For example, compared to known crude fiber optic encoders and conventional self-imaging encoders, this interferometric-type encoder can operate with a relatively smaller scale pitch, in order to conveniently provide finer measurement resolution. Furthermore, such an interferometric-type encoder can operate reliably over a much larger range of operating gaps relative to the scale, allowing simpler installation and more reliable operation. The readhead includes a light source for transmitting light to the scale grating and detector channels for receiving light from the scale grating. In accordance with one aspect of the invention, the detector channels of the encoder readhead are fiber optic detector channels. Electronic readhead receivers (photodetectors) such as disclosed in the '283 patent suffer limitations in converting the high frequency detector signals associated with high speed scale motion and transmitting those signals over long cables without significant signal loss or interference. In addition, electronic photodetectors and the associated circuit connections contribute to readheads that are too large for many potential encoder applications. It will be appreciated that the fiber optic detector channels of the present invention overcome these limitations.

In accordance with another aspect of the invention, the fiber optic encoder readhead detects the location of interference fringes arising from a scale grating using multiple fiber optic detector channels having respective phase grating masks. Optical fiber tip receptors such as those disclosed in the '071 patent have insufficient spatial resolution for fine phase signal discrimination if they have a large diameter, and gather too little light to provide a good signal if they have a small diameter. Thus, their accuracy is limited. It will be appreciated that the fiber optic detector channels of the present invention overcome these and other limitations to provide high accuracy.

In accordance with another aspect of the invention, the fiber optic encoder readhead utilizes an interferometric arrangement. In one embodiment, the scale grating is designed to suppress the $0^{th}$ and all even orders of diffraction from the grating while the fiber-optic readhead is designed to reject or avoid the 3rd and higher orders of diffraction from the scale grating. The combination of the scale grating and fiber optic readhead produces a high-resolution interferometric-type encoder that detects displacement by sensing interference fringes arising from only, or at least primarily, the plus and minus 1st orders of diffraction.

In accordance with a further aspect of the invention, a fiber optic interferometric-type encoder is provided with an ultra-compact size that is unprecedented.

In accordance with another aspect of the invention, the fiber optic encoder readhead is constructed according to a design relationship based on a source light divergence angle, at least one scale light diffraction angle, and a radius that bounds the input apertures of the fiber optic detector channels, to insure reliable operation and accuracy.

In accordance with a further aspect of the invention, the fiber optic encoder readhead is operably positioned relative to a scale according to a design relationship based on the source light divergence angle, at least one scale light diffraction angle, and a radius that bounds the input apertures of the fiber optic detector channels, to insure reliable operation and accuracy.

In accordance with a separate aspect of the invention, the fiber optic detector channels are arranged in balanced pairs, to provide enhanced accuracy.

In accordance with a further aspect of the invention, three balanced pairs of fiber optic detector channels are signal processed in a manner that provides enhanced accuracy.

In accordance with a separate aspect of the invention, the light source is provided by an optical fiber, to provide an all-optical readhead, free of all limitations and costs associated with electronic assembly and electronic signals within an encoder readhead.

In accordance with a separate aspect of the invention, the various optical fibers of the fiber optic encoder are selected from various types such that the encoder measurement accuracy is relatively unaffected by bending of the fiber optic readhead cable.

In accordance with a separate aspect of the invention, various embodiments of the fiber optic encoder readhead are constructed in a particularly economical, accurate and compact manner.

In accordance with a separate aspect of the invention, the fiber optic encoder readhead is constructed such that it may be inserted into a standard commercially available fiber optic connector configuration.

In accordance with a separate aspect of the invention, a light deflecting element is provided to deflect the readhead light path between the basic readhead elements and the scale grating, such that the operable mounting orientation of the readhead relative to the scale is changed.

In accordance with separate aspect of the invention, in one embodiment a remote interface box is utilized that contains appropriate electronic light sources and photodetectors that interface with the fiber optics to and from one or more fiber optic readheads according to this invention, and converts received optical signals to a form suitable for further signal processing and readhead position determination.

Hence, the invention overcomes the disadvantages of prior art optical displacement sensing devices and provides new application possibilities with an ultra-compact, highly accurate, economical and high speed configuration.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9 is a partly orthographic, partly isometric view of a third embodiment of a fiber-optic readhead arrangement according to this invention;

FIG. 10 shows an exemplary receiver channel optical fiber usable according to this invention;

FIG. 11 shows an exemplary a light source optical fiber usable according to this invention;

DETAILED DESCRIPTION OF THE PREFERRED EMBODIMENT

Figure 1:
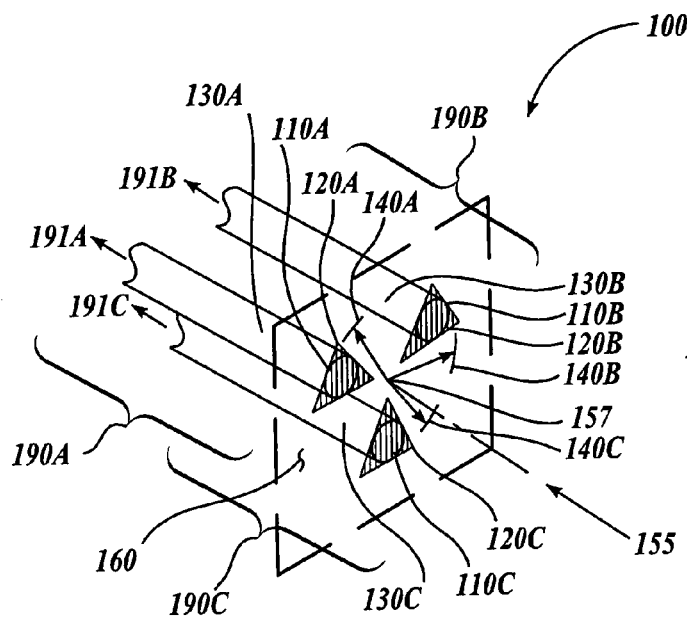
FIG. 1 is an isometric view of a first generic embodiment of a fiber-optic receiver channel arrangement according to this invention.

FIG. 1 shows a first generic embodiment of a fiber-optic receiver channel arrangement 100 according to this invention. As shown in FIG. 1, the fiber-optic receiver channel arrangement 100 includes three fiber-optic receiver channels 190A, 190B and 190C. The fiber-optic receiver channel 190A includes a receiver channel aperture 110A, a phase mask 120A, and a receiver optical fiber 130A. Similarly, the fiber-optic receiver channel 190B includes a receiver channel aperture 110B, a phase mask 120B, and a receiver optical fiber 130. Similarly, the fiber-optic receiver channel 190C includes a receiver channel aperture 110C, a phase mask 120C, and a receiver optical fiber 130C.

For each fiber-optic receiver channel 190, the phase mask 120 includes a grating that completely covers the receiver channel aperture 110, acting as a spatial filter for incoming illumination. The receiver optical fiber 130 is aligned with the receiver channel aperture 110 such that nominally all illumination received by the receiver channel aperture 110 is channeled down the optical fiber 130 to provide an optical signal 191. In various exemplary embodiments, the receiver channel aperture 110 is simply a flat end of the receiver optical fiber 130. In various other exemplary embodiments, the receiver channel aperture 110 is a shaped end of the receiver optical fiber 130. In various other exemplary embodiments, the receiver channel aperture 110 is a compact refractive or diffractive lens, which gathers the incoming illumination through the phase mask 120, concentrates the light, and directs the light to the end of the receiver optical fiber 130, which is aligned to receive the light efficiently. The receiver channel aperture 110, the phase mask 120 and the end of the receiver optical fiber 130 of each fiber-optic receiver channel 190 are fastened in a fixed relationship to each other by adhesives or other suitable methods.

In various exemplary embodiments according to this invention, the phase masks 120 are arranged in a coplanar arrangement that defines and/or coincides with a nominal receiving plane 160. Various exemplary embodiments of the phase masks 120, as well as their specific orientation and individual phase positions are described in detail further below. The location of the receiver channel apertures 110 is conveniently described with reference to a channel arrangement center 157 of the fiber-optic receiver channel arrangement 100. In various high accuracy optical fiber readhead embodiments according to this invention, the channel arrangement center 157 is positioned to coincide with the nominal center of any interference illumination field presented to the fiber-optic receiver channel arrangement 100, as described further below. Each respective receiver channel aperture 110A–110C is located within a receiver aperture bounding radius 140A–140C from the channel arrangement center 157, as shown in FIG. 1. The receiver aperture bounding radius is generically indicated as $R_{CR}$ herein.

Useful receiver aperture bounding radii 140 may be determined according to the principles of this invention as discussed in detail with reference to FIGS. 6, 7 and 8, below. In various exemplary embodiments, the receiver channel apertures 110 are identical and their respective bounding radii 140 are identical. Generally, using identical fiber-optic receiver channels 190 in a fiber optic readhead according to this invention allows simpler construction, simpler signal processing and relatively higher measurement accuracy. However, more generally, the receiver channel apertures 110 and/or their respective bounding radii 140 need not be identical in various exemplary embodiments according to this invention.

The fiber-optic receiver channels 190 are generally arranged in a fixed relationship to each other. In particular, the gratings of the phase masks 120 of each fiber-optic receiver channel 190 are nominally coplanar and are fixed in a particular spatial phase relationship with respect to one another in the receiving plane 160. In various exemplary embodiments, the phase masks 120 are fixed in a particular spatial phase relationship by fabricating them on a single mask substrate, as described further below. Exemplary assembly pieces and methods are discussed in detail further below.

Figure 2:
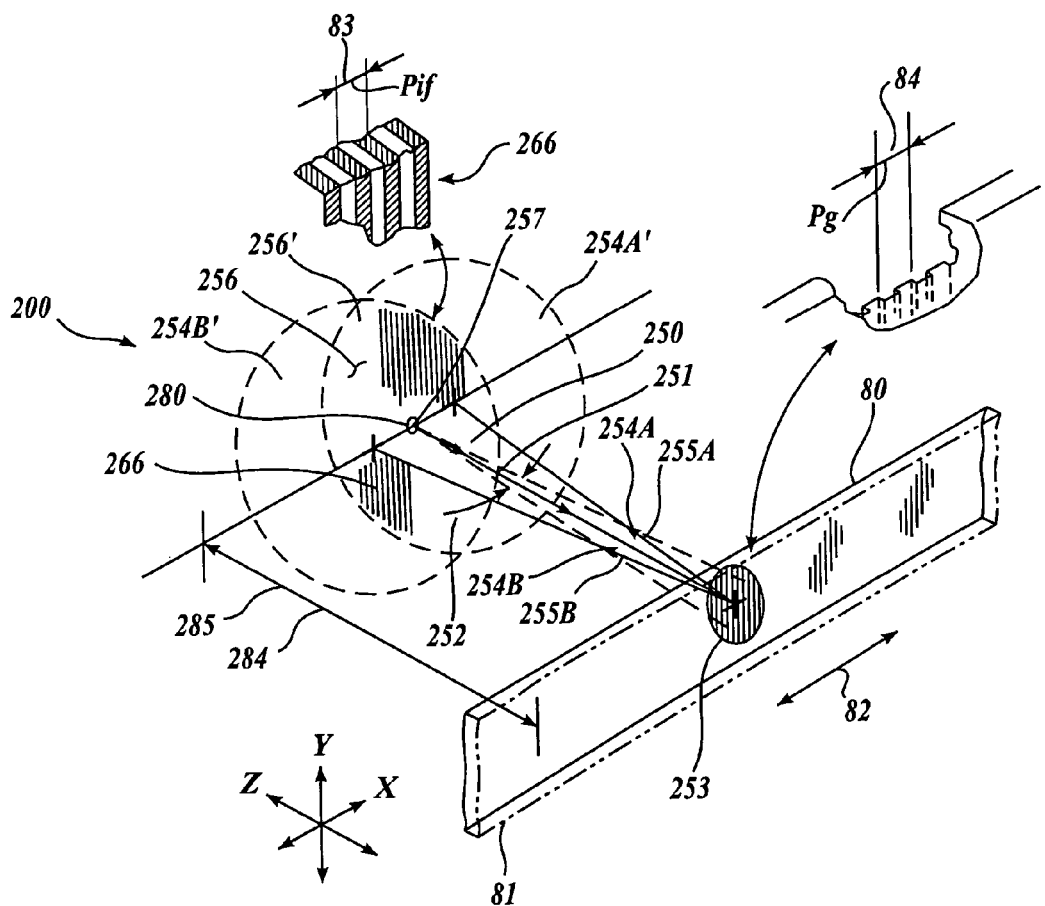
FIG. 2 is an isometric view of a first generic embodiment of an interferometric arrangement usable in various exemplary fiber optic readheads according to this invention.

FIG. 2 shows a first generic embodiment of an interferometric arrangement 200 usable in various exemplary fiber optic readheads according to this invention. The basic principle of interferometric encoders is well known and is not described in detail herein. The interferometric arrangement 200 includes a light source 280 and a scale grating 80, separated by a source gap 284. The dimension of the source gap is generally indicated as either $z_s$ or, if the source gap 284 and a receiver gap 285 are approximately the same, as z or Z herein. The scale grating 80 is aligned along a measuring axis 82 and in the exemplary embodiment shown in FIG. 2 is a phase grating that includes grating elements extending perpendicular to the measuring axis 82, as indicated by vertical lines in an illumination spot 253. The grating elements are arranged periodically along the measuring axis 82 according to a grating period 84, generally indicated herein as the grating period or grating pitch $P_g$. The scale grating 80 is discussed in greater detail with reference to FIG. 5, below.

The X, Y and Z axes shown in FIG. 2 may be defined with reference to the plane of the scale grating 80. The X axis is parallel to the plane of the scale grating 80 and to the measuring axis 82. The X-Y plane is parallel to the plane of the scale grating 80 and the Z axis is perpendicular to that plane.

In the generic interferometric arrangement 200, the light source 280 emits a source light 250 generally along a source light axis 251. The source light is generally monochromatic or quasi-monochromatic and has a nominal wavelength $\lambda$. The source light 250 generally diverges at a divergence half-angle 252. The sine of the divergence half angle is commonly referred to as the numerical aperture NA of the light source, and in contrast to some of the incorporated references, the divergence half angle is generally considered to include most, for example 90%, or nearly all, for example 99%, of the source light energy when referred to herein. The source light 250 travels over a distance equal to a source gap 284 and illuminates the scale grating 80 at an illumination spot 253. The surface relief structure of the scale grating 80 suppresses the zero order reflection and the duty cycle of the scale grating 80 suppresses the even-order diffraction orders as discussed in greater detail with reference to FIG. 5, below. The +3 and −3 diffraction orders, and higher odd-order diffraction orders generally detract from the ability to accurately interpolate the measurement signals of a fiber-optic readhead according to this invention in order to increase the position measurement resolution, and in various exemplary embodiments a fiber-optic readhead according to this invention is arranged to avoid detecting the light arising from the +3 and −3 diffraction orders, and higher odd-order diffraction orders. Thus, only the light of the +1 and −1 diffraction orders are illustrated in FIG. 2, since only the light and interference arising from these diffraction orders is detected in various embodiments according to this invention. The light of the zero order, even order, and $3^{rd}$ and higher odd diffraction orders are not illustrated in FIG. 2, but are discussed in greater detail with reference to FIGS. 6 and 7, below.

The +1 and −1 diffraction orders are diffracted and reflected as the scale light 254A and 254B generally along the scale light axes 255A and 255B as shown in FIG. 2. It should be appreciated that the scale light axes 255A and 255B correspond to the diffraction of the central ray of the source light 250. Thus, the central scale light axes 255A and 255B follow the first order diffraction angles, for example, the angles defined by ±arcsine($\lambda/P_g$) when the central ray of the source light 250 is incident approximately normal to the plane of the scale grating 80, as shown in FIG. 2. Each of the +1 and −1 diffraction order scale lights 254A and 254B, respectively, continue to diverge about the scale light axes 255A and 255B to provide illumination zones 254A' and 254B' as indicated by the dashed circles showing the approximate cross-section of the illumination zones 254A' and 254B' at a plane coinciding with the receiver gap 285 in FIG. 2. The illumination zones 254A' and 254B' of the scale light 254A and 254B intersect to provide an interference zone 256' including interference fringes 266.

At a plane coinciding with the receiver gap 285 the interference zone 256' has a cross-section as indicated by the intersection of dashed circles corresponding to the illumination zones 254A' and 254B'. It is convenient to describe the cross-section of the interference zone 256' as defining an interference illumination field 256 at the plane corresponding to the receiver gap 285, that plane also coinciding with any collocated receiver plane 160 as outlined above and discussed in greater detail below. The interference illumination field 256 has an illumination field center 257 that coincides with the light source 280 and the source light axis 251 in the embodiment shown on FIG. 2.

The interference fringes 266 in the interference zone 256' consist of light and dark interference fringe zones, each extending perpendicular to the measuring axis 82 along both the Z and Y directions. The light and interference fringe zones are periodic along the direction parallel to the measuring axis 82 according to an interference fringe period 83, generally indicated herein as the interference fringe period or interference fringe pitch $P_{if}$. Thus, because the interference fringe zones extend along the direction perpendicular to the plane of the scale grating 80, operable interference illumination fields 256 exist for a range of potential receiver gaps 285 and corresponding receiver planes 160 throughout the interference zone 256'. Accordingly, the receiver gap 285 and the corresponding location of the receiver planes 160 can generally varying within a reasonable tolerance range without significantly affecting the operation or accuracy of various fiber-optic readhead embodiments according to the principles of this invention.

In various exemplary embodiments according to this invention, a particularly simple and effective embodiment of the light source 280 is the end of a single optical fiber that emits coherent or quasi-coherent light provided by a remote laser diode or other light source that is operational to provide the interference fringes described above. In various exemplary embodiments, such a fiber optic light source is a single mode fiber, without a separate lens or collimator, that outputs a diverging source light beam from its end, the diverging light beam typically having a divergence half angle in the range of 4.5 to 12 degrees for a single mode fiber. In various other exemplary embodiments, the light source 280 is a periodic array of source grating apertures arranged at the end of one or more optical fibers that transmits light from a remote LED or other suitable light source. In yet other exemplary embodiments, the light source 280 is provided by a miniature solid state laser element, a solid state laser array, or a source grating and a miniature LED element contained in the fiber optic readhead. In such cases, it should be appreciated that the readhead construction may become more complex and costly, and some of the benefits of an all-optical readhead are lost. However, even in such cases, at least some of the benefits of a readhead incorporating an all-optical receiver channel arrangement according to this invention will remain.

Figure 3:
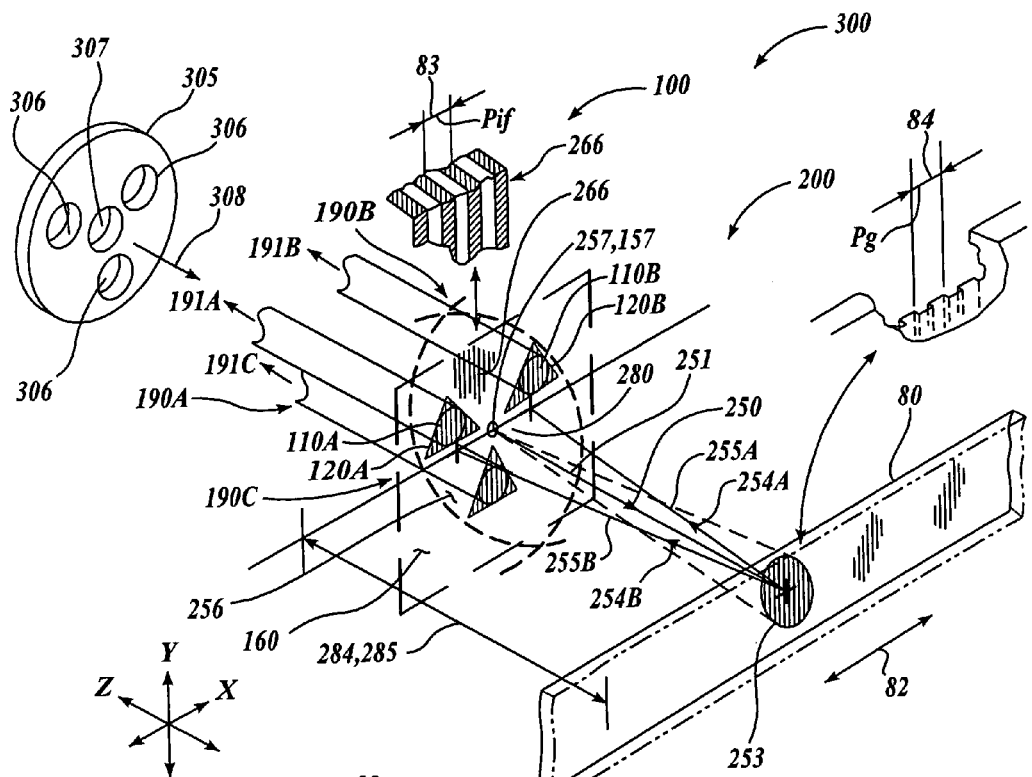
FIG. 3 is an isometric view of a first generic embodiment of a fiber-optic readhead arrangement according to this invention.

FIG. 3 shows a first generic embodiment of a fiber-optic readhead arrangement 300 according to this invention. The fiber-optic readhead arrangement 300 includes the first generic embodiment of a fiber-optic receiver channel arrangement 100 and the first generic embodiment of an interferometric arrangement 200, as previously described with respect to FIG. 1 and FIG. 2, respectively. As shown in FIG. 3, the light source 280 emits the source light 250, generally along a source light axis 251. The source light 250 travels over a distance z equal to a source gap 284, illuminates the scale grating 80, which is carried on a scale 81 shown in dashed outline, at an illumination spot 253. The illumination spot 253 reflects plus and minus first order diffraction light as scale light 254A generally along the scale light axis 255A and scale light 254B generally along the scale light axis 255B, respectively, as described above with reference to FIG. 2. The plus and minus first order scale lights 254A and 254B travel over a distance z equal to the receiver gap 285 where they intersect to provide the previously described interference illumination field 256 at the receiver plane 160 of the fiber-optic receiver channel arrangement 100.

At the receiver plane 160, previously described with reference to FIG. 1, the channel arrangement center 157 is nominally aligned with the illumination field center 257. It should be appreciated that in this embodiment of the fiber-optic readhead arrangement 300, the source 280 is also nominally aligned with the illumination field center 257. The alignment of all components is readily achieved in various exemplary embodiments by the use of an alignment plate generally located proximate to and aligned with the phase masks and having the required number of receiver fiber holes and, source fiber holes, if applicable. The various fiber ends are inserted and fixed in the appropriate holes to provide the required alignments. FIG. 3 shows an "exploded view" including one exemplary alignment plate 305. The arrow 308 indicates that the alignment plate 305 is to be positioned proximate to the phase masks 120, not in the "exploded" position illustrated. The alignment plate 305 has receiver fiber holes 306 and a source fiber hole 307, if applicable in various embodiments. At the receiver plane 160, for each respective fiber-optic receiver channel 190, the respective phase mask 120 spatially filters the incoming interference fringes of the interference illumination field 256. In the exemplary embodiment shown in FIG. 3, the respective phase masks 120A, 120B and 120C each have a mask pitch $P_m$ that is the same as the interference fringe pitch $P_{if}$, and they are arranged at respective spatial phase positions of 0 degrees, 120 degrees and 240 degrees in terms of the interference fringe pitch $P_{if}$. Thus, the fiber-optical fiber receiver channels 190A, 190B and 190C receive illumination similarly spatially filtered except for a spatial phase difference. Thus, the optical signals 191A, 191B and 191C corresponding to the optical receiver channels 190A, 190B and 190C show approximately identical sinusoidal intensity variations as the scale grating 80 moves along the measuring axis, but with relative phase shifts of 120 degrees. Well known methods are available for determining the displacement of the scale grating 80 relative to the phase masks 120A, 120B and 120C based on such "three-phase" displacement signals. It should be appreciated that because the light in each of the +1 and −1 diffraction orders that gives rise to the interference fringes is diffracted once by the scale grating, when the grating moves by one pitch increment cycle the corresponding fringes in the interference illumination field 256 will move by 2 cycles. That is, for the embodiment shown in FIG. 3, as the scale grating 80 moves by an increment $P_g$ along the measuring axis, the interference fringes 266 in the interference illumination field 256 move by an increment of $2*(P_{if})$ relative to the phase masks 120.

Thus, the exemplary fiber-optic readhead arrangement 300 shown in FIG. 3 provides a displacement measuring system usable in a variety of fiber optic readheads according to this invention. It will also be appreciated by one of ordinary skill in the art that the reflective fiber-optic readhead arrangement 300 shown in FIG. 3 has a transmissive fiber-optic readhead arrangement counterpart. In such a case, the light source 280 is located along the Z axis on the opposite side of a transmissive scale grating, at any operable source gap 284' between the light source 280 and the scale grating. In such a case, a transmissive phase grating is used for the scale, with an optical path length difference of an odd integer times ½ the wavelength of the light between the portions of the scale grating that alternate along the measuring axis, in order to suppress the zero-order transmitted light.

The exemplary fiber-optic readhead arrangement 300 provides a three-phase measurement system. However, it will be appreciated that alternative embodiments of the phase masks 120, along with corresponding alternative arrangements of the optical receiver channels 190 are usable in the generic fiber optic readhead arrangement 300. Various exemplary embodiments of the phase masks 120, including embodiments that provide optical signals having a quadrature phase relationship, or higher order phase relationships, are described in detail further below.

Figure 4:
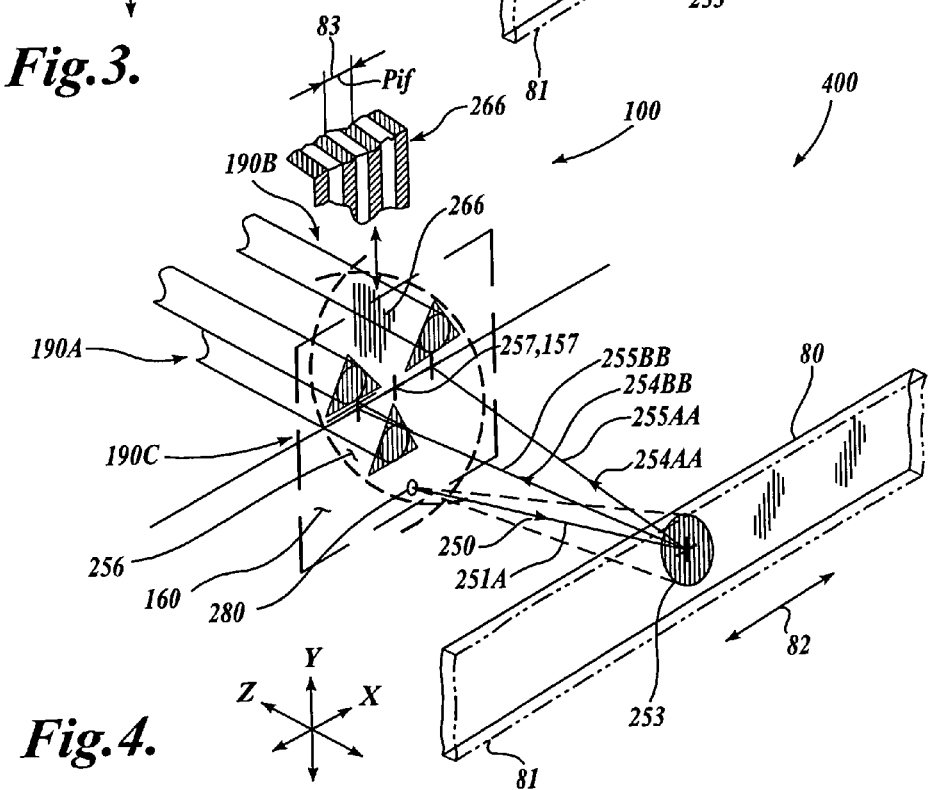
FIG. 4 is an isometric view of a second generic embodiment of a fiber-optic readhead arrangement according to this invention.

FIG. 4 shows a second generic embodiment of a fiber-optic readhead arrangement 400 according to this invention that operates in the same manner as the fiber-optic readhead arrangement 300, except as noted in the following description. The elements that lack reference numerals in FIG. 4 will be understood to be the same as the apparently similar elements in FIG. 3. The fiber-optic readhead arrangement 400 includes the first generic embodiment of a fiber-optic receiver channel arrangement 100 as previously described with respect to FIG. 1 and a second generic embodiment of an interferometric arrangement.

As shown in FIG. 4, the light source 280 emits the source light 250, generally along a source light axis 251A that lies in the Y-Z plane at an angle below the X-Z plane, as shown. This angle below the X-Z plane is designated $-\beta$ in this discussion. The source light 250 propagates a distance defined as $z_s$ to illuminate the scale grating 80 at the illumination spot 253. The illumination spot 253 diffracts plus and minus first order light as scale light 254AA generally along the scale light axis 255AA, and scale light 254BB generally along the scale light axis 255BB, respectively. The scale light axes 255AA and 255BB lie at an angle $+\beta$ above the X-Z plane. It will be appreciated that for light ray components in the direction parallel to the Y-Z plane the grating scale acts like a plane mirror. The plus and minus first order scale lights 254AA and 254BB travel over a distance defined as z to the receiver plane 160, where they intersect to provide the previously described interferometric illumination field 256.

At the receiver plane 160, the channel arrangement center 157 is nominally aligned with the illumination field center 257, similarly to the fiber-optic readhead arrangement 300. Thus, as in the fiber-optic readhead arrangement 300, the fiber-optical fiber receiver channels 190A, 190B and 190C receive illumination that is similarly spatially filtered except for a spatial phase difference and produce the corresponding optical signals 191A, 191B and 191C in the fiber-optic readhead arrangement 400.

Thus, the fiber-optic readhead arrangement 400 shown in FIG. 4.*provides* an alternative "angled" arrangement where the source 280 is separated from the channel arrangement center 157 and the illumination field center 257. It will also be appreciated by one of ordinary skill in the art that the reflective fiber-optic readhead arrangement 400 shown in FIG. 4 has a transmissive fiber-optic readhead arrangement counterpart. In such a case, in comparison to FIG. 4, the light source 280 is located in a symmetric position on the opposite side of the X-Y plane of the scale grating 80, along an extension of the line that bisects the angle between the scale light axes 255AA and 255BB. It will be appreciated that in such a case, the scale grating 80 is a transmissive scale grating. In such a case, a transmissive phase grating is used for the scale, with an optical path length difference of an odd integer times ½ the wavelength of the light between the portions of the scale grating that alternate along the measuring axis, in order to suppress the zero-order transmitted light.

Such alternative arrangements are usable in a variety of fiber optic readheads according to this invention. It will be appreciated that alternative embodiments of the phase masks 120, along with corresponding alternative arrangements of the optical receiver channels 190, are usable in the second generic fiber optic readhead arrangement 400. Various exemplary embodiments of the phase masks 120, including embodiments that provide optical signals having a quadrature phase relationship, or higher order phase relationships, are described in detail further below.

Figure 5:
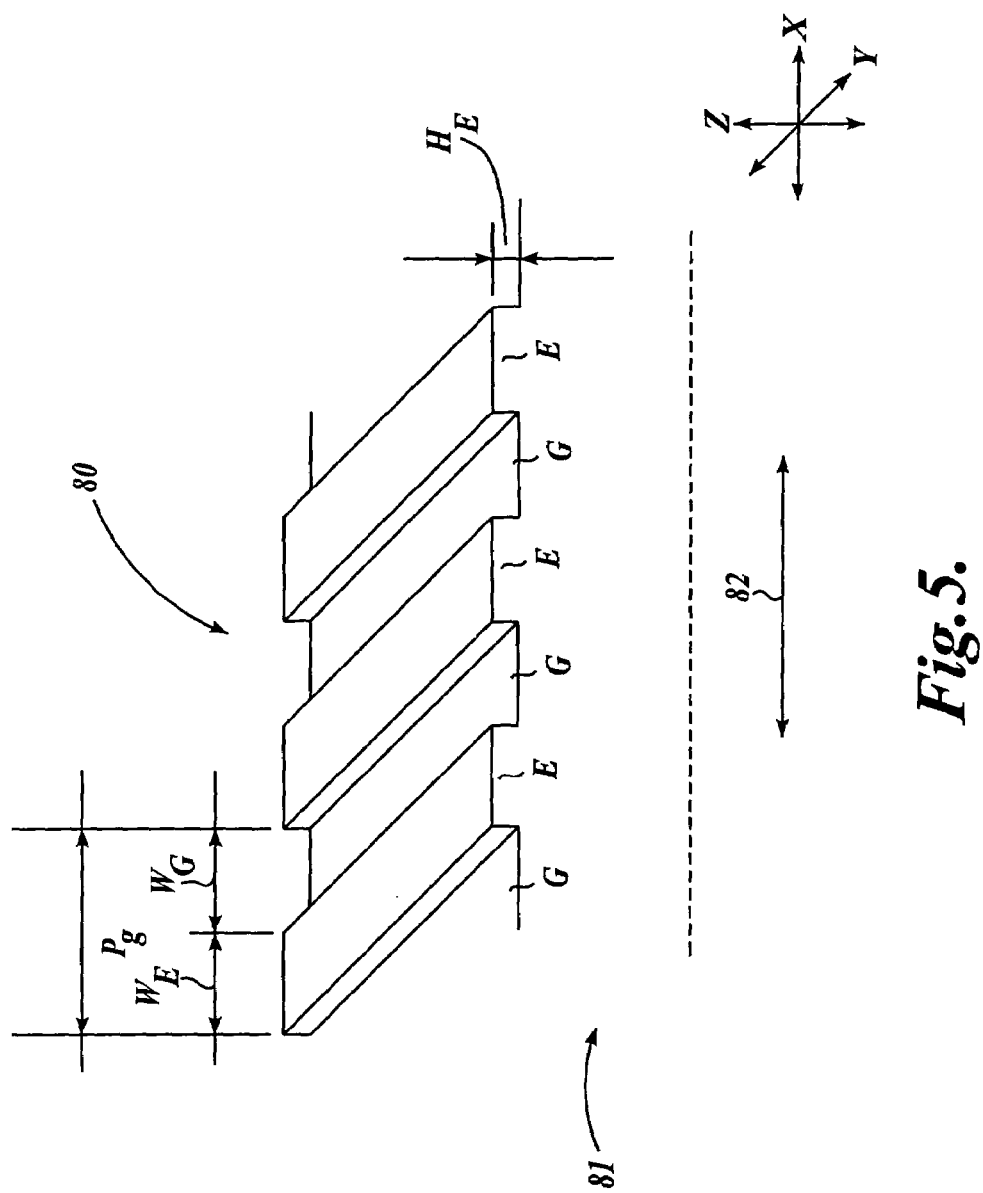
FIG. 5 is an isometric view showing the grating structure of a first exemplary embodiment of a scale grating according to this invention.
Figure 6:
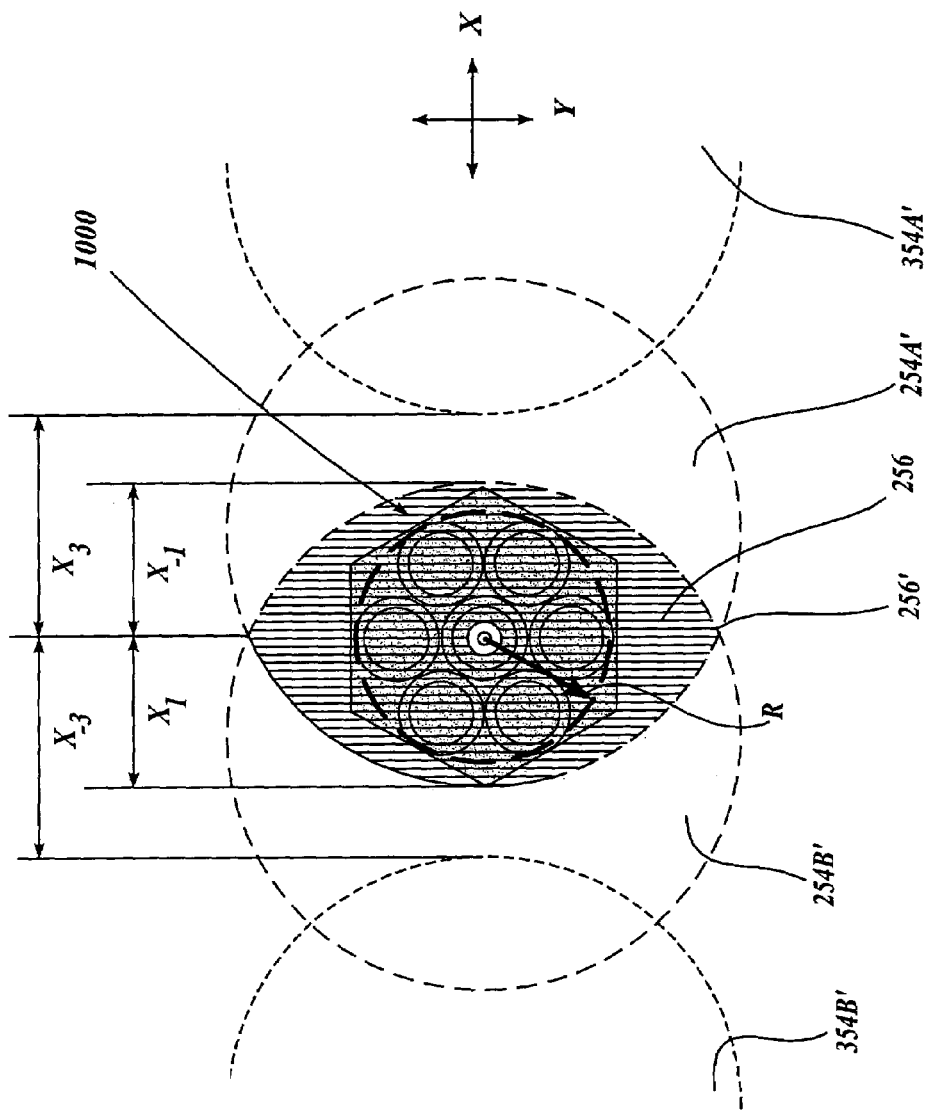
FIG. 6 is schematic view along a direction perpendicular to the receiving plane of an exemplary fiber-optic readhead according to this invention, illustrating one exemplary configuration of various light beams arising from an illuminated scale relative to the features of the fiber-optic readhead, when the readhead is operably positioned relative to the scale according to the principles of this invention.
Figure 7:
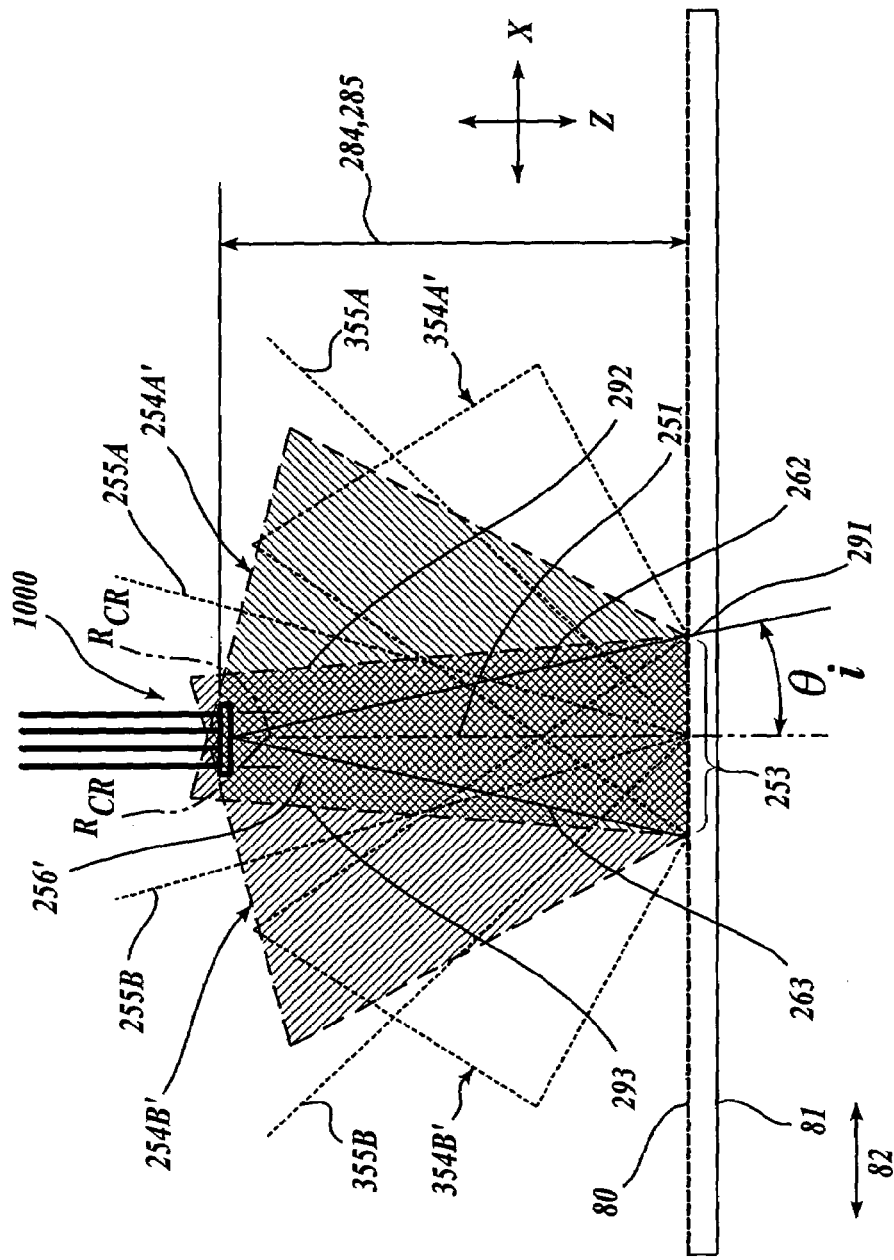
FIG. 7 is schematic view approximately corresponding to the exemplary configuration of FIG. 6 viewed along a direction perpendicular to the measuring axis and parallel to the receiving plane of an exemplary fiber-optic readhead according to this invention, showing the various light beams arising from an illuminated scale relative to the features of the fiber-optic readhead, when the readhead is operably positioned relative to the scale according to the principles of this invention.

FIG. 5 shows a first exemplary embodiment of a scale grating and FIGS. 6 and 7 are schematic views corresponding to an exemplary configuration for an operably positioned fiber-optic readhead according to this invention. As will be described in more detail below, the scale grating of FIG. 5 is designed to suppress the $0^{th}$ and all even orders of diffraction arising from the scale grating, while the fiber-optic readhead of FIGS. 6 and 7 is designed and operably positioned to avoid or reject the effects of light from the 3rd and higher orders of diffraction in the optical measurement signals provided according to the principles of this invention. The combination of the scale grating of FIG. 5 and the fiber optic readhead configuration of FIGS. 6 and 7 produces a high-resolution interferometric-type encoder that primarily or only detects interference light arising from the plus and minus 1st orders of diffraction. This high-resolution interferometric-type encoder has advantages over a variety of previously known encoders, such as crude types of fiber optic encoders and conventional self-imaging encoders, which generally cannot operate with a scale pitch that is as fine as fine scales that are suitable for an interferometric type encoder (e.g., in one example, the scale pitch for a self-imaging encoder may need to be approximately 8 µm, including 4 µm reflector portions and 4 µm space portions, or larger, otherwise the operating gap tolerance may be too small for practical use). The interferometric-type encoder will not only work with smaller scale pitches to provide high-resolution, it will also have a larger operating gap tolerance, due to the extension of the detected interference fringes along the direction perpendicular to the plane of the scale grating. In one example embodiment with a 2 um scale pitch, a doubling of the signal pitch relative to scale pitch due to the use of the plus and minus 1st orders of diffraction, and a 200X interpolation, the achievable resolution of an interferometric-type encoder would allow approximately 5 nm position resolution. This high-resolution interferometric-type encoder has advantages over a variety of previously known interferometric-type encoders in that it provides the benefits of optical output signals and provides an unprecedented combination of compact size and high resolution.

FIG. 5 shows a first exemplary embodiment of the scale grating 80 that is designed to suppress the $0^{th}$ and all even orders of diffraction. The scale grating 80 is a reflective phase grating formed on a substrate 81, and is aligned along a measuring axis 82. The scale grating 80 includes grating elements E extending along the direction of the Y-axis, perpendicular to the measuring axis 82, that are separated by recessed elements G. Grating elements E are arranged periodically along the measuring axis 82, according to a grating pitch $P_g$. Each of the grating elements E has a width $W_E$ along the direction of the measuring axis 82, while each of the recessed elements G has a width $W_G$. The grating elements E also have a height $H_E$ along the direction of the Z-axis.

As described above, the scale grating 80 of FIG. 5 is designed to suppress the $0^{th}$ order reflected light and all even diffraction orders. Methods for accomplishing this are known in the art. For example, in one exemplary embodiment, the scale grating 80 may be formed as a reflective phase grating with a reflective coating, chrome for example, on both the rectangular grating elements E and the recessed elements G, and with a height $H_E$ that causes destructive interference of the $0^{th}$ order reflected light, for example a height of ¼ of the wavelength of the source light. A 50% duty cycle, that is, $W_E$ approximately equal to $W_G$, contributes to the best suppression of the $0^{th}$ order reflected light and also suppresses the rest of the even diffraction orders. These factors are illustrated with reference to EQUATIONS 1 and 2 below. The phase change φ of the reflected light having the wavelength λ after traversing the distance $H_E$, to and from the recessed elements G, is:

$$\varphi = -4\pi \frac{H_E}{\lambda} \quad \text{(Eq. 1)}$$

For destructive interference between the light reflected from the rectangular grating elements E and the recessed elements G, the height $H_E$ is chosen such that:

φ=kπ . . . (with k=an odd integer)   (Eq. 2)

Other ways of suppressing and/or directing away the zero-order reflected light with a grating are also known in the art, such as utilizing diffractive scale elements with blazes at first diffraction orders, or using a sinusoidal grating. A sinusoidal grating would allow for the suppression of all diffraction orders except for the plus and minus first orders, which accomplishes the design goals set forth above, but in certain implementations it is more costly to manufacture than a rectangular grating such as that illustrated in FIG. 5. As will be described in more detail below, when using a rectangular scale grating 80 such as that illustrated in FIG. 5, various features may be incorporated into a fiber-optic readhead according to this invention, to reject the remaining higher order diffraction orders other than the desired plus and minus first orders.

FIG. 6 is a schematic view along a direction perpendicular to the receiving exemplary configuration of various light beams arising from an illuminated scale relative to the features of the fiber-optic readhead, when the readhead is operably positioned relative to the scale according to the principles of this invention. Furthermore, FIG. 7 is a schematic view approximately corresponding to the exemplary configuration of FIG. 6 viewed along a direction perpendicular to the measuring axis and parallel to the receiving plane of an exemplary fiber-optic readhead according to this invention, showing the various light beams arising from an illuminated scale relative to the features of the fiber-optic readhead, when the readhead is operably positioned relative to the scale according to the principles of this invention. Certain elements of FIGS. 6 and 7 are similar to those of FIGS. 2 and 3 as described above, and as such only certain aspects of the similar elements will be described below with respect to FIGS. 6 and 7. It should be appreciated that the relative sizes of some features are differently shown in FIGS. 6 and 7 for the purpose of clear illustration of different aspects of the operation of an exemplary fiber-optic readhead according to this invention. However, the common numbering and explanation of such features with reference to FIGS. 6 and 7 should be understood to refer to comparable features.

FIGS. 6 and 7 illustrate a generic operational configuration of a representative interferometric fiber-optic readhead arrangement 1000 according to this invention. As shown in FIG. 6, the representative readhead 1000 may also be formed with a six optical fiber receiver channel configuration, as will be described in more detail below with respect to FIG. 13. As best shown in FIG. 7, the representative fiber-optic readhead arrangement 1000 includes a compact light source that emits a source light generally along a source light axis 251, the source light diverging as indicated schematically by the dashed lines 252 and 253. The source light has a nominal wavelength λ. The source light travels over a distance equal to the source gap 284 and illuminates the scale grating 80 at an illumination spot 253. As described above with respect to FIG. 5, the structure of the scale grating 80 suppresses the zero order reflection and the duty cycle (e.g., 50%) of the scale grating 80 contributes to the best suppression of the zero order reflection and suppresses the even-order diffraction orders. The +3 and −3 diffraction orders, and higher odd-order diffraction orders generally detract from the accurate operation of a fiber-optic interferometric readhead according to this invention, and as will be described in more detail below, in various exemplary embodiments the fiber-optic readhead according to this invention is arranged to avoid detecting the light of the +3 and −3 diffraction orders, and higher odd-order diffraction orders.

The +1 and −1 diffraction orders are diffracted and reflected as scale light 254A and 254B generally along the scale light axes 255A and 255B. It should be appreciated that the scale light axes 255A and 255B correspond to the diffraction of the central ray of the source light. Thus, the central scale light axes 255A and 255B follow the first order diffraction angles $\pm \arcsin(\lambda/P_g)$. Each of the +1 and −1 diffraction order scale lights 254A and 254B, respectively, continue to diverge about the scale light axes 255A and 255B to provide illumination zones 254A' and 254B'. The illumination zones 254A' and 254B' of the scale light 254A and 254B intersect to provide an interference zone 256'.

As best seen in FIG. 6, at a plane coinciding with the receiver gap 285 the interference zone 256' has a cross-section as indicated by the intersection of the circles corresponding to the illumination zones 254A' and 254B'. It is convenient to describe the cross-section of the interference zone 256' as defining an interference illumination field 256 at the plane corresponding to the receiver gap 285, that plane also coinciding with any collocated receiver plane as described above.

FIGS. 6 and 7 also schematically illustrate the light of the third diffraction orders. The +3 and −3 diffraction orders are diffracted and reflected to produce the scale light 354A and 354B generally along the scale light axes 355A and 355B. It should be appreciated that the scale light axes 355A and 355B correspond to the diffraction of the central ray of the source light 250. Each of the +3 and −3 diffraction order scale lights 354A and 354B, respectively, continue to diverge about the scale light axes 355A and 355B to provide illumination zones 354A' and 354B'.

As noted above, in various exemplary embodiments, a fiber-optic readhead according to this invention is arranged to avoid detecting the light of the +3 and −3 diffraction orders, and higher odd-diffraction orders. It should appreciated that to provide high resolution and accuracy based on the sinusoidal signals provided by an interferometric fiber optic readhead according to this invention, it is desirable not only to count the number scale wavelengths or scale grating pitch units accumulated in order to establish an accumulated displacement or position to a resolution comparable to the scale pitch, it is also desirable to interpolate within the "initial" and "most recent" wavelength to as high a degree as possible, to provide the finest achievable levels of measurement resolution. Generally, according to one consideration, the interpolation level corresponds roughly to the S/N ratio, that is, with an S/N of 1, no meaningful interpolation of the peak-to-peak sinusoidal signal is possible. In addition, the majority of signal processing techniques for interpolating the raw measurement signals in encoders assume that such signals are ideal or nearly ideal sinusoidal functions of relative displacement between the scale and readhead. Thus, interpolation errors arise due to non-ideal, non-sinusoidal signals. It should be appreciated that the light of the $+/-3^{rd}$ diffraction orders contributes to non-ideal, non-sinusoidal signals if it reaches the receiver apertures of a fiber optic readhead according to this invention.

Thus, as illustrated in FIGS. 6 and 7, in various exemplary embodiments, the representative readhead 1000 is designed and operably positioned such that it avoids the illumination zones 354A' and 354B' of the +3 and −3 diffraction orders, while it is also designed and operably positioned in the cross-section of the illumination zones 254A' and 254B' of the +1 and −1 diffraction orders, that is, in the interference zone 256', so as to receive and detect interference light of the +1 and −1 diffraction orders as shown in FIG. 7, and best seen in FIG. 6.

As illustrated in FIG. 6, dimensions $X_1$ and $X_{-1}$ are defined between the center of the representative readhead 1000 and the right hand and left hand edges, respectively, of the cross section of the illumination zones 254A' and 254B', along the direction perpendicular to the interference fringes. Also, a dimensions $X_3$ and $X_{-3}$ are defined between the center of the representative readhead 1000 and the nearest edges of the illumination zones 354A' or 354B', respectively, corresponding to the +3 and −3 diffraction orders. It should be appreciated that the representative readhead 1000 is radially symmetric, and therefore the receiver aperture bounding radius $R_{CR}$ is the same for each fiber optic receiver aperture shown in FIG. 6. Therefore, to meet the design requirements of receiving the interference light arising from the +1 and −1 diffraction orders, while avoiding the light of the +3 and −3 diffraction orders as described above, it is sufficient if the representative fiber-optic readhead 1000 is designed and operably positioned to position the apertures of the fiber optic receiver channels within a fiber optic receiver aperture bounding radius $R_{CR}$ that may approach the distance $X_1$ but is certainly less than the distance $X_3$. However, more generally, the receiver aperture arrangement of a fiber optic readhead according to this invention need not be radially symmetric and the receiver aperture bounding radius $R_{CR}$ may be different for various receiver apertures. Accordingly, more generally, to meet the design requirements of receiving the interference light arising from the +1 and −1 diffraction orders, while avoiding the light of the +3 and −3 diffraction orders as described above, it is sufficient if each individual receiver aperture bounding radius $R_{CR}$ falls within the interference illumination field 256 at the plane corresponding to the receiver gap 285, and the light of the +3 and −3 diffraction orders does not overlap with any of the individual fiber optic receiver apertures.

One method for designing suitable fiber optic readhead geometry and positioning such as that illustrated in FIGS. 6 and 7, which is intended to detect only the light of the +1 and −1 diffraction orders, can be represented by the following simplified model. The model is designed to find a suitable readhead geometry and positioning to achieve m>2 rejection, where m is the diffraction order, and m=2 is suppressed by the scale because of the 50% duty cycle, or by other known means. This model primarily considers rays that fall within the solid angle defined by the source divergence half angle and that are aligned in a plane extending through the center of a light source located approximately at the center of a readhead arrangement and extending along the measuring axis direction 82 and perpendicular to the plane of the scale grating. The model begins with a readhead having a radius $R_{CR}$ bounding the receiving apertures of the fiber optic receiver channels of the readhead. The receiving apertures may be assumed to be fiber optic receiver cores of diameter d, for example. The divergence of the source light is described by a divergence angle $\theta_i$, the readhead is assumed to be operably positioned at an operating gap Z from the scale, with the central ray of the source light normal to the nominal plane of the scale. For the light reflected/diffracted from the scale, the diffraction angle for the central ray of the first order diffraction light (m=1) is designated $\theta_m=1$ or $\theta_1$.

A first relationship is defined as:

$$x = Z \tan(\theta_i). \qquad \text{(Eq. 3)}$$

The coordinate axis for "x" is defined along the measuring axis direction, with the location of the central ray of the source light taken as the zero position. With reference to FIG. 7, positions to the right of zero are defined as positive. Angles are defined as positive when the angle lies in a clockwise direction relative to a line normal to the surface of the scale.

Now consider a configuration in which a rightmost diverging source ray strikes the scale at a location x, point 291 in FIG. 7, and diffracts. If we ensure that the m=−1 diffraction ray 292 from location x travels to the right of the readhead detectors, other m=−1 rays from other source rays at other locations α<x in the illumination spot 253 must then strike the readhead, providing 100% coverage of the detectors. Similarly, if we ensure that the m=+1 diffraction ray 293 from location −x travels to the left of the readhead detectors, other m=+1 rays from other source rays at other locations α>−x in the illumination spot 253 must then strike the readhead, providing 100% coverage of the detectors with interference fringes. In other words, with reference to FIG. 6, we want the condition of overlapped $1^{st}$ diffraction orders that fully cover the circle of radius $R_{CR}$ on the readhead, which can be represented by the following design criteria expressions:

$$x_1 < -R_{CR} \text{ and } x_{-1} < R_{CR} \qquad \text{(Eq. 4)}$$

An analogous analysis provides similar design criteria expressions for excluding m=+/−3 diffraction orders from the readhead detection area. With reference to FIG. 6, we want:

$$x_{-3} < -R_{CR} \text{ and } x_3 > R_{CR} \qquad \text{(Eq. 5)}$$

The values for $x_1$, $x_{-1}$, $x_3$ and $x_{-3}$ are evaluated based on the most extreme values for x that occur for a various divergence angles $\theta_i$ and operating gaps Z. Because of the symmetry in this system, we only need to consider two of the four inequalities. We thus choose:

$$(x_{-1}) = Z(\tan \theta_i + \tan \theta_1) > R_{CR} \text{ and } (x_{-3}) = Z(\tan \theta_i + \tan \theta_{-3}) < -R_{CR} \qquad \text{(Eq. 6)}$$

We make use of the diffraction equation, $$\sin \theta_m = C_m = m\lambda/P_g + \sin \theta_i, \ m = 1,3 \qquad \text{(Eq. 7)}$$

By substituting and simplification, we have $$x_{-1} = Z\left(\tan\theta_i + \frac{C_1}{\sqrt{1 - C_1^2}}\right) > R_{CR} \qquad \text{(Eq. 8)}$$

and $$x_{-3} = Z\left(\tan\theta_i + \frac{C_{-3}}{\sqrt{1 - C_{-3}^2}}\right) > R_{CR} \qquad \text{(Eq. 9)}$$

In general, a desirable readhead design and associated operating gap Z can be determined iteratively from these equations. Alternatively, assuming a given wavelength $\lambda$, these equations can be used to map a 3-dimensional set of constraints for a particular value of $R_{CR}$, having axes corresponding to variables that are the divergence angle $\theta_i$, the operating gap Z, and the grating pitch $P_g$.

Certain example parameter values can be used to illustrate the operation of these equations. In one exemplary embodiment, the readhead can use a wavelength $\lambda$ of 635 nm, and a readhead active area radius equivalent to an $R_{CR}$ of 375 um. We then evaluate $x_{-1}$ and $x_{-3}$ for a range of pitches, gaps and divergence angles. This produces results that indicate that pitches $P_g$ down to ~2 microns or less may be used with proper selection of the divergence angle $\theta_i$, the operating gap Z. Small readhead active area radii and larger operating gaps and divergence angles lead to the smallest pitches possible. In one exemplary embodiment, the foregoing design constraints are satisfied by a readhead configuration using a scale with a 4 um pitch and a 50% scale grating duty cycle, a wavelength of 635 nm, a readhead active area radius equivalent to an $R_{CR}$ of 375 microns, a divergence half angle of approximately 9–9.5 degrees and a nominal operating gap of approximately 2.5–3.0 mm.

It should be appreciated that the divergence angle can be controlled by the selection of a particular source fiber, having a particular light-carrying core geometry or fiber end configuration, for example, in various exemplary embodiments. In various other exemplary embodiments, drilling a hole in the mask element that carries the receiver phase masks may allow additional space that may be required for a fiber-tip lens, or the like. It should also be appreciated that the mask element placed over the receiver fibers could have the central region corresponding to the source fiber location etched or otherwise machined or its index of refraction modified to form a lens that would increase the divergence angle of the light from the source fiber. Other means, as would be apparent to one of ordinary skill in the art are possible, for example, a separate diffractive optical element lens that could be attached to the central, external surface of the mask element. The benefits of having a lens mounted on or incorporated into the mask element instead of as an altered fiber tip include ease of polishing the assembled fiber ends and allowing active alignment of the lens to the fiber when the mask element is aligned and attached to the ferrule.

The operating gap and operating gap tolerance of a readhead configuration such as that illustrated in FIG. 7 is also important. Because this is an interferometric-type encoder, interference fringes will extend vertically through a significant range along the Z-axis. However, it should be appreciated that in various configurations too small of an operating gap may allow $3^{rd}$ order light to reach the readhead receiver apertures and too large of an operating gap may decrease rotational misalignment tolerances, excessively lower the available optical signal strength due to the diverging source light in some embodiments and/or reduce the size of the interference illumination field 256 to a degree that renders the readhead inoperable or inaccurate in other embodiments. However, in accordance with the above equations and certain example configurations, a gap tolerance of approximately 1 mm or larger may be easily be achieved in various exemplary embodiments.

It should be appreciated that decreased illumination wavelengths allow smaller scale grating pitches, so a design with a wavelength less than 635 nm would allow scale periods significantly smaller than 2 um. For example, one exemplary embodiment includes a commercially available UV laser diode that provides $\lambda$=375 nm, a scale grating pitch $P_g$=1.2 μm, and 80 micron diameter fused silica or other UV-transmissive material optical fibers to provide $R_{CR}$=120 μm. Thus, according to the design parameters listed above and the design criterion of EQUATION 8, a readhead arrangement with a divergence half angle of approximately 9.8 degrees an operating gap of approximately 3 mm is possible. It will be appreciated that the divergence angle and gap can be further optimized by simulation or experiment in various exemplary embodiments.

As previously outlined, it should be appreciated that if such a divergence half angle is not inherently provided by the NA of a desired source fiber, that it is within the scope of this invention to include a GRIN lens, a shaped fiber end, or the like, in order to provide the desired NA for the source light emitter in a compact readhead arrangement. However, it should also be appreciated that decreasing scale pitches lead to an increasing sensitivity to a given amount of yaw misalignment of the readhead. Thus, related design and mounting tradeoffs should be considered for very small scale grating pitches. Yaw misalignment errors are discussed in greater detail below, with reference to FIG. 16.

Importantly, it should also be appreciated that in various exemplary embodiments it is within the scope of this invention to select various readhead design parameters such that $P_g < 3*\lambda$. It should be appreciated that in such exemplary embodiments, the $3^{rd}$ order diffraction is evanescent, and thus cannot direct light toward the readhead regardless of other aspects of the readhead design and mounting arrangement. One such exemplary embodiment includes an illumination wavelength of $\lambda$=405 nm from a commercially available laser diode, a scale grating pitch $P_g$=0.96 μm, and 80 micron diameter optical fibers to provide $R_{CR}$=120 μm. The readhead is further design to provide a source divergence half angle of approximately 15 degrees. Such a design for a readhead can be used with an operating gap of approximately 1 mm or greater. In such an embodiment, all diffraction orders except for the +/−1 diffraction orders are suppressed or evanescent, thereby increasing the optical signal power arising from the +/−1 orders and relaxing other design considerations.

Regarding the interference fringes in the interference zone 256', it should be appreciated that due to the divergence of the source light that illuminates the scale grating 80, the interference fringes do not actually form ideal parallel planes having a constant spacing at all distances from the scale grating 80. However, in various exemplary embodiments according to this invention where the source gap 284 and the receiver gap 285 are approximately the same, this provides a configuration that provides a relatively constant and uniform interference fringe pitch $P_{if}$ that is nominally equal to the scale grating pitch $P_g$ in the interference illumination field 256 at the plane of the receiver phase masks at the receiver gap 285, regardless of the specific shared dimension of the source gap 284 and the receiver gap 285, and regardless of the specific operational divergence half angle used for a particular readhead design and mounting arrangement. Thus, in various exemplary embodiments according to this invention that use such a configuration, the phase mask pitch is set equal to the scale grating pitch $P_g$.

It should also be appreciated that due to the divergence of the source light that illuminates the scale grating 80, the interference fringes in the interference illumination field 256 at the plane of the receiver phase masks at the receiver gap 285 are nearly ideal near the center of the interference illumination field 256, but tend to show increasing distortion at locations of increasing radius away from the center of the interference illumination field 256. Thus, it should be appreciated that the very compact readhead dimensions provided in various exemplary embodiments according to this invention have the further benefit of being locatable entirely within the relatively ideal central region of the interference illumination field 256, in order to provide excellent measurement signals and corresponding accuracy despite the use of a simply and economically provided diverging source light. In various exemplary embodiments according to this invention, for this reason the readhead dimensions and especially the location of the various receiver apertures and corresponding phase masks is made as compact as practical design constraints allow. It should also be appreciated that the interference fringes in the interference illumination field 256 remain more nearly ideal at a relatively larger radius along the direction parallel to the Y-axis and through the center of the illumination field 256, in comparison to other directions. Thus, in various exemplary embodiments where some of the receiver channel apertures are located at relatively larger radii from the center of the illumination field 256 compared to others of the receiver channel apertures, it is advantageous for the "larger location radii" apertures to be located on or near to a line along the direction parallel to the Y-axis and through the center of the illumination field 256.

It should be appreciated that for a variety embodiments according to the principles of this invention, in general, as the operating gap is increased, the size of the interference illumination field 256 increases and the intensity of the detected light in the interference illumination field 256 decreases accordingly. Thus, in certain exemplary embodiments the nominal operating gap will generally be determined based on the tradeoffs between attaining a desired signal level, and practical mounting and compactness considerations. An operating gap tolerance will generally be determined at a level that maintains signal levels within a range that is adequate to maintain a desired minimum resolution and accuracy. In addition, generally, the larger the gap, the more sensitive the readhead will be to dynamic misalignment pitch errors. Thus, in various exemplary embodiments for certain applications requiring reduced misalignment pitch sensitivity, a relatively smaller operating gap is used.

When the application requires the direction of the fibers leaving the readhead to be rotated 90 degrees from a normal angle to the scale, in certain other exemplary embodiments, a relatively larger operating gap allows a turning prism to be inserted into the nominal operating gap of the readhead and still have operating gap clearance from the readhead to the scale. Such applications and embodiments are discussed further below with reference to FIGS. 20A, 20B, and 21.

The following discussion is relevant to the results described with reference to FIG. 8, below. It should be appreciated that optical fiber readheads according to the present invention can be ultra-miniature readheads. It should be appreciated that in contrast with the relatively crude optical fiber encoder readheads that do not use an interferometric arrangement and/or that are not designed to provide high resolution and high accuracy position measurement signals, both the size and inherent signal to noise ratio of such optical fiber encoder readheads are critical. Design constraints such as a desired or economical fiber size, practical interference illumination field sizes obtained directly from optical fiber sources at specific operating gaps, and practical assembly positioning constraints are all important design considerations.

For all of these reasons, it is advantageous to observe certain design relationships related to providing an accurate signal while maintaining a compact readhead size, a desired scale grating pitch, and a compact mounting arrangement, in light of various design constraints. Such design relationships not only indicate the design conditions related to optimum performance, but also indicate a range where design tradeoffs may be made for the sake of assembly techniques, component cost, or other reasons, while still retaining micron-level or even sub-micron level resolution and accuracy. As discussed in more detail below, certain design factors for optical fiber encoder readheads can be used to provide a desirable sinusoidal signal in various exemplary optical fiber encoder readhead embodiments according to this invention, while also maintaining a compact mounting arrangement and other desirable features.

Figure 8:
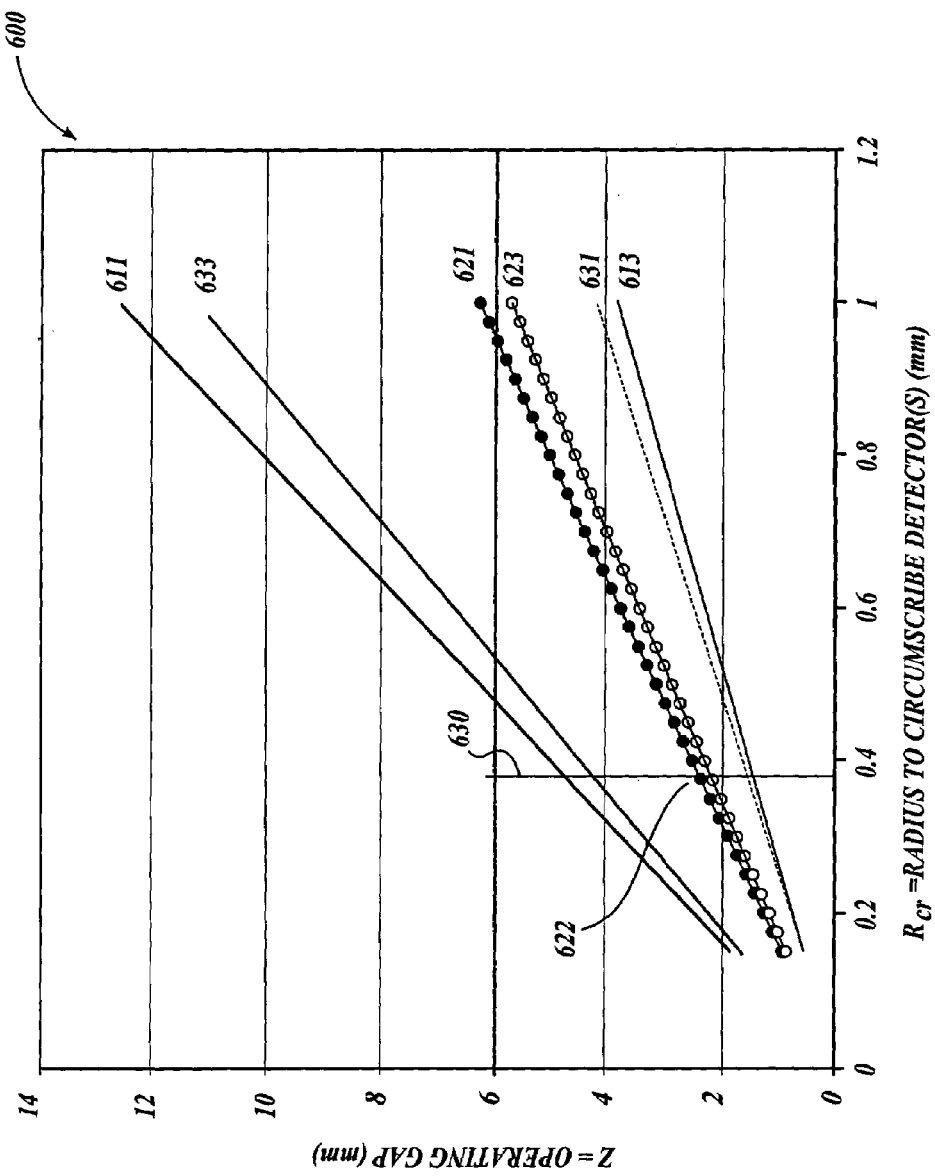
FIG. 8 is a diagram showing representative relationships between a minimum operating gap and a radius that encompasses the receiver apertures of the fiber optic detector channels of a fiber-optic readhead arrangement according to this invention, for various source light divergence angles.

FIG. 8 is a diagram 600 showing representative relationships between various minimum operating gaps and radii that encompass the receiver apertures of the fiber optic detector channels of various fiber-optic readhead arrangements according to this invention, for various source light divergence angles. The relationships shown in FIG. 8 generally correspond to the simplified model discussed with above with reference to EQUATIONS 3–9, with selected exemplary design values of the wavelength λ=635 nm and the scale grating pitch $P_g$=4 microns. For convenient reference, the Littrow angle=$\lambda/(2*P_g)$ corresponding to these design values is approximately 4.55 degrees. As shown in FIG. 8, the horizontal axis indicates various values for the previously described readhead design parameter $R_{CR}$, that is, the radius that encompasses or bounds the receiver apertures of a readhead. The vertical axis indicates various values for the operating gap Z. Each of the relationship lines 611, 621 and 631 indicates the minimum operating gap Z that is allowed for various values of $R_{CR}$ according to the design criterion of EQUATION 8 and the exemplary design values indicated above, which insures that the various receiver apertures fall within the first order light interference illumination field 256. The relationship lines 611, 621 and 631 correspond to source divergence half-angles of 6.8 degrees=1.5*Littrow angle, 9.1 degrees=2*Littrow angle, and 11.4 degrees=2.5*Littrow angle, respectively. Each of the relationship lines 613, 623 and 633 indicates the minimum operating gap Z that is allowed for various values of $R_{CR}$ according to the design criterion of EQUATION 9 and the exemplary design values indicated above, which insures that the light of the +/−3$^{rd}$ diffraction orders is directed away from the area of the various receiver apertures. The relationship lines 613, 623 and 633 correspond to source divergence half-angles of 6.8 degrees=1.5*Littrow angle, 9.1 degrees=2*Littrow angle, and 11.4 degrees=2.5*Littrow angle, respectively.

It should be appreciated that if the source divergence half angle does not exceed the Littrow angle, then the overlap of the +/−1$^{st}$ diffraction orders will be such that the interference illumination field 256 is insufficient and/or non-existent. Thus, in various exemplary embodiments according to this invention, it is desirable that the source divergence half angle exceeds the Littrow angle. In various other exemplary embodiments, in order that a relatively more compact operating gap is obtained, it is desirable that the source divergence half angle exceed (1.5*Littrow angle). As shown in FIG. 8 by the relationship lines 611, 621 and 631, when the source divergence half angle is increased from (1.5*Littrow angle) to (2*Littrow angle), the allowable operating gap is generally reduced by approximately one half, and it is even further reduced when the source divergence half angle is increased to (2.5*Littrow angle). Therefore, in yet other exemplary embodiments, in order that an even more compact operating gap is obtained, it is desirable that the source divergence half angle exceeds (2*Littrow angle), and in yet other even more compact exemplary embodiments, (2.5*Littrow angle). However, it should be appreciated that when a end of single mode optical fiber is used as the light source, the NA or corresponding divergence half angle that is economically or practically obtainable with such fibers may be the factor that practically limits the combination of Littrow angle-determining factors, that is the scale wavelength and/or scale grating pitch, that is usable for a particularly economical readhead design according to the principles of this invention. Of course, as previously outlined, the use of a GRIN lens, a shaped fiber end, a lens mounted on or incorporated into the phase mask element, or the like, in order to provide the desired NA is also within the scope of this invention. Therefore, such fiber NA limitations may be overcome with relatively little additional expense in various other designs.

It should also be appreciated, as shown by the slopes of the relationship lines 611, 621, 631, 613, 623, and 633 in FIG. 8, that for the exemplary design values indicated above, more compact receiver aperture arrangements according to the principles of this invention advantageously allow smaller permissible operating gaps, regardless of the source divergence half-angle. Considering for the moment the relationship lines 621 and 623, which both correspond to the a source divergence half-angle of approximately 9.1 degrees, for the exemplary design values indicated above the controlling minimum allowable gap indicated by the relationship line 621 is a little over 6 mm for $R_{CR}$=1.0 mm. In various exemplary embodiments according to this invention, it is desirable to provide an operating gap of approximately 6 mm, or less, therefore, in various exemplary embodiments according to this invention, the receiver apertures are all located within a diameter of (2* $R_{CR}$)=2.0 mm. As shown in FIG. 8 by each of the relationship lines 611–633, when the receiver aperture bounding radius $R_{CR}$ is decreased by approximately one quarter, the allowable operating gap is also generally reduced by approximately one quarter, and it is even further reduced when the receiver aperture bounding radius $R_{CR}$ is further reduced. Therefore, in yet other exemplary embodiments, in order that an even more compact readhead and operating gap be obtained, the receiver apertures are all located within a diameter of (2* $R_{CR}$)=1.5 mm, and in yet other even more compact exemplary embodiments, the receiver apertures are all located within a diameter as small as 1.0 mm, 0.75 mm, or even smaller.

As previously mentioned, it should be appreciated that for a variety embodiments according to the principles of this invention, in general, as the operating gap is increased, the size of the interference illumination field 256 increases and the intensity of the detected light in the interference illumination field 256 decreases accordingly, which generally reduces the available signal strength. Thus, in various exemplary embodiments according to this invention, a relatively compact operating gap is desirable. Accordingly, in various exemplary embodiments according to this invention, the operating gap is arranged to be less than 10 times the receiver aperture bounding radius $R_{CR}$ and/or less than 5 times a diameter that bounds all the receiver apertures of a readhead. For example, the readhead configuration corresponding to the point 622 shown at the intersection of the line 630 and the relationship line 621 in FIG. 8, which corresponds approximately to $R_{CR}$=0.375 mm, would be arranged with an operating gap less than approximately 3.75 mm. However, it should be appreciated that in various other exemplary embodiments, operating gaps that are larger relative to various readhead dimensions may be used, and several of the benefits of an interferometric fiber optic readhead according to this invention will still be provided.

It should be appreciated that the plot 600 shown in FIG. 8, is based one exemplary set of design values, simply to provide one exemplary plot for purposes of clarifying certain design relationships and explanations that are applicable to various exemplary embodiments according to this invention. Thus, it should be appreciated that the particular exemplary set of design values and the resulting relationship lines shown in the plot 600 are exemplary only, and not limiting.

FIG. 9 shows a third embodiment of a fiber-optic readhead arrangement 500 according to this invention, which is configured similarly to, and operates similarly to, the generic fiber-optic readhead arrangement 300 described above with reference to FIG. 3. Due to these similarities in configuration and operation, only certain aspects of the fiber-optic readhead arrangement 500 that require additional explanation, are described below.

As shown in FIG. 9, the fiber-optic readhead arrangement 500 includes three fiber-optic receiver channels 590A–590C, which operate similarly to the previously described fiber-optic receiver channels 190A–190C. For example, the fiber-optic receiver channel 590A includes a receiver channel aperture 510A, a phase mask 520A, and a receiver optical fiber 530A. Also included is a phase mask element 561 of a transparent material, an alignment plate 305' that is essentially similar to the generic alignment plate 305 previously described, and a light source 580 provided by the end of a source fiber 570. The source fiber 570 carries laser light input at a remote end of the fiber that is proximate to a remote laser source, for example as described with reference FIG. 12, below. The laser light is emitted as source light from the readhead-end of the source fiber 570 to provide a light source 580 suitable for an interferometric-type arrangement according to this invention. In various exemplary embodiments, the readhead end of the source fiber 570 is flat and perpendicular to the fiber axis, and is butted against the phase mask element 561. An exemplary source fiber 570 is described in detail below.

The phase mask element 561 may be constructed according to any now known or later developed thin film techniques, materials and processes, such as those currently used to fabricate a number of commercially available encoder readheads, or the like. For the exemplary embodiment shown in FIG. 9, the phase mask element 561 is a triangularly shaped element carrying the phase masks 520A–520C as shown. The phase mask element 561 is transparent and free of opaque mask elements in the vicinity of the light source 580. Thus, the source light is transmitted through the phase mask element 561. According to the previously described principles of this invention, the phase masks 520A–520C are arranged in a coplanar arrangement on a surface of the phase mask element 561, and that surface defines the receiving plane 160 which is nominally aligned with the interference illumination field 256 (not shown). The inventor has found that in some readhead embodiments according to this invention, better performance results when such phase mask elements are on the surface that is positioned nearest the ends of the receiver optical fibers, such as the ends of the receiver optical fibers 530A–530C in this exemplary embodiment.

In one exemplary embodiment, each of the exemplary phase masks 520A–520C is fabricated with a 4 micron pitch, to match an interference fringe pitch $P_{if}$ provided by an exemplary scale grating 80 (not shown), having a scale grating pitch 4 microns and the scale grating 80 is illuminated with 635 nanometer laser light for the light source 580 at a nominal operating gap of approximately 2.5+/−0.5 mm. In such a case, for a typical divergence half angle from a fiber optic light source 280 of approximately 9 degrees to include on the order of 90+% of the optical energy of the beam, the design value for the receiver aperture bounding radius $R_{CR}$, indicated by the reference numeral 540, is approximately 0.375 mm.

The phase masks 520A–520C are arranged to provide a three-phase measuring system. Thus, taking the edge of a grating bar 521A in the phase mask 520A as a reference, the corresponding edges of the grating bars in the phase mask 520B will be spatially phase shifted in a first direction along the X axis by +120 degrees of spatial phase shift, or 1/3*4 microns, modulo 4 microns. The corresponding edges of the grating bars in the phase mask 520C will be spatially phase shifted in the opposite direction along the X-axis by the same amount, 1/3*4 microns, modulo 4 microns. In one exemplary embodiment, the spatial duty cycle of the phase masks 520 is 50/50. In various other exemplary embodiments, the duty cycle (and even the nominal pitch) of the phase masks 520 may be adjusted according to any known or later developed method, to suppress any remaining spatial harmonics in the received interference fringes, and/or to correct for interference fringe aberrations or the like.

The grating bars 521 of the phase masks 520 should completely cover each respective receiver channel aperture 510. In the exemplary embodiment shown in FIG. 9, this includes making most of the grating bars 521 of a length equal to the outer diameter of the underlying receiver optical fiber 530, plus an additional length sufficient to encompass any assembly tolerance variations. Likewise, sufficient periods of the mask grating should be present to cover the receiver area in the direction orthogonal to the grating bar length, plus any additional amount required due to tolerance considerations. However, it should be appreciated that the effective receiver aperture 510 of a receiver optical fiber 530 is typically less than its outer diameter, so this a conservative guideline and not a limiting design criterion. An exemplary receiver optical fiber 530 is described in detail below.

It should be appreciated that for reduced errors and performance that is more consistent from receiver to receiver in a various exemplary fiber optic readheads according to this invention, the signal amplitudes between the various fiber-optic receiver channels are nominally balanced, and phase errors resulting from edge effects at the boundary of the phase mask are minimized. It should also be appreciated that when the pitch of the phase masks is coarse relative to the size of the optical fiber receiver apertures, the effective open aperture area of each channel between the bars of the phase masks can depend significantly on the phase mask offset relative to the aperture center or outline. Since the phase mask offset may be for different fiber-optic receiver channels, this may unbalance the amplitudes of the various phase signals and potentially cause related phase measurement errors. Thus, in various exemplary embodiments according to the this invention, a respective optical fiber receiver aperture diameter is at least 3 times the grating pitch of its respective phase mask. In various other embodiments it is at least 5 times the grating pitch of its respective phase mask, and yet other embodiments it is at least 8 times the grating pitch of its respective phase mask, such that offset-related edge quantization effects, formed in the fiber receiver aperture by the phase mask grating bars, are sufficiently controlled. It should be appreciated the previous fiber optic encoders designed for only for relatively crude accuracy and resolution have not adequately considered this factor.

In one exemplary embodiment of the fiber-optic readhead arrangement 500, the source fiber 570 has an outer diameter of 50 microns, and is concentric with the channel arrangement center 157, as previously described with reference to FIGS. 1 and 3. The outer diameter of each of the receiver optical fibers 530 is 250 microns, and they are all located at the same radius from the channel arrangement center 157 to provide the same receiver aperture bounding radius 540, generically indicated as $R_{CR}$, of 375 microns. All fibers are butted against the phase mask element 561 along with the alignment plate 305', and the resulting assembly is joined together by an appropriate optical grade adhesive, or the like. Care is to be taken that all apertures are free of materials that attenuate light significantly. In various exemplary embodiments, all components are placed with positional tolerances on the order of 10–50 microns. The inventor has determined that for the exemplary design values previously described, the fiber-optic readhead arrangement 500 provides resolution well below one-tenth micron, and sub-micron accuracy when a reasonable and practical level of care is taken in assembly, alignment and signal processing of the optical signals provided by the arrangement.

Thus, the fiber-optic readhead arrangement 500 provides a 3-phase optical readhead usable in a variety of interferometric fiber optic readheads according to this invention. It should be appreciated that all critical components of the fiber-optic readhead arrangement 500 are encompassed within an overall diameter of approximately 750 microns. Therefore, when non-essential peripheral portions of the alignment plate 305' and the phase mask element 560 are removed, the fiber-optic readhead arrangement 500 provides a high resolution, high accuracy optical fiber readhead arrangement that provides interferometric based measurement signals in a sub-millimeter total readhead diameter.

FIG. 10 shows one exemplary receiver channel optical fiber usable as the receiver optical fiber 530, and in various other embodiments according to this invention. As FIG. 10 shows, the receiver optical fiber 530 has a central core area 531 of diameter $D_{RA}$ 532 that, together with surrounding cladding layer 533 of diameter $D_{RC}$ 534, acts as a waveguide or multiple waveguides for light that impinges upon it. The core area 531 thus provides the receiver channel aperture 510. An additional "buffer" layer 535 (which may actually be comprised of a number of thinner layers that are not relevant to this discussion) provides an outer receiver diameter of $D_{RF}$ 536. The buffer layer 535 is optional in various exemplary embodiments. In various other exemplary embodiments, the buffer layer 535 surrounds the cladding layer 533 for purposes of protection and/or is custom sized for providing the best outer receiver diameter $D_{RF}$ for purpose of convenient and economical geometric packing, spacing and assembly according to certain principles of this invention.

In one exemplary embodiment, the receiver optical fiber 530 is a commercially available multimode fiber that is a silica fiber with 200/220/250 micron core/cladding/buffer diameters $D_{RA}/D_{RC}/D_{RF}$. Even thinner cladding is commercially available, down to a layer only 5 microns thick or less, depending on the core diameter 532. It will be appreciated that receiver. optical fibers with large receiver aperture diameters providing a maximum ratio of core diameter 532 to outside diameter 536 may provide the strongest signals and highest accuracy in various exemplary embodiments, as described in detail further below. A thin layer of cladding 533 helps provide optical isolation of the receiver 530. In various other embodiments according to this invention, plastic receiver optical fibers are used.

In other exemplary embodiments, commercially available multiple core fibers are used. Such fibers have advantages in allowing tighter bending radii in the receiver fibers within the cable of an optical fiber readhead. These fibers have multiple cores interspersed with cladding material within the clear aperture area 510. Also available are multiple core fibers where each individual core can be large enough to be used as a fiber-optic receiver channel according to this invention, and the inherent multiple core fiber spacing forms the receiver geometry in various optical fiber encoder readheads according to this invention. In other exemplary embodiments, such fibers are not used because of larger size, higher cost, and/or restricted cable bending radius, in comparison to the individual receiver fibers previously discussed. It should appreciated that economical single mode optical fibers generally have a small core diameter, which allows a small size but also limits the available signal strength in various exemplary embodiments according to this invention. Thus, in various other exemplary embodiments according to this invention the ends of a number of multimode fibers are used together to form each of the receiver apertures, such as the previously described receiver apertures 110 and/or 510, or the like.

FIG. 11 shows an exemplary a light source optical fiber usable as the light source optical fiber 570 to provide the light source 580 shown in FIG. 9, and in various other embodiments according to this invention. As shown in FIG. 11, the light source fiber 570 has a central core 571 of diameter $D_{SA}$ 572 surrounded by a cladding layer 573 of diameter $D_{SC}$ 574, which is surrounded by buffer layer 575 giving an outer fiber diameter of $D_{SF}$ 576. In various exemplary embodiments all or part of the buffer layer is omitted or removed to allow flexible optical fiber sizing for purposes of constructing the readhead with desired fiber spacing, and to achieve a desired overall readhead diameter. Such flexible optical fiber sizing is used to provide for economical geometric packing, spacing and assembly according to certain principles of this invention, in various exemplary embodiments. In various other exemplary embodiments, the buffer layer 575 may be present, and flexibly increased in size, for similar purposes of economical geometric packing, spacing and assembly convenience. In various other exemplary embodiments, the cladding and/or buffer layer is specified at a desired size and is fabricated with sufficient precision to provide the nominally desired geometric packing, spacing and assembly convenience.

It should be appreciated that the inventor has determined that to provide the most stable signals and highest accuracy in various exemplary embodiments using a laser diode source, the source fiber should operate as a true single mode optical fiber at the operating wavelength of the light source, in order to maintain a constant distribution and amount of light in the illumination field of a fiber-optic readhead according to this invention. The illumination field from such source fibers is relatively immune to bending of the cable of a fiber optic encoder according to this invention. This is a significant factor in most practical applications of position encoders. It should be appreciated the previous fiber optic encoders designed for only for relatively crude accuracy and resolution have not adequately considered this factor.

In various exemplary embodiments, for an operating wavelength of 635 nm, the core diameter of a suitable single mode optical fiber is on the order of $D_{SA}$=4 microns. In such embodiments, the light source optical fiber is a single mode optical fiber that effectively acts as a point source. In various exemplary embodiments, the single mode optical fiber furthermore has an outer diameter at the emitting end of less than 50 microns, for example, to facilitate a small readhead diameter. In various exemplary embodiments, the single mode optical fiber has an outer diameter at the emitting end of greater than 50 microns, for example, to facilitate a desired readhead assembly spacing. In one particular exemplary embodiment the single mode fiber used as a point source for an operating wavelength of 635 µm is the part number FS-SN-3224 made by 3M Corporation. This single mode fiber has an outer diameter of $D_{SF}$=250 microns, thus providing a fiber which can be conveniently used in economical close packing assembly arrangements such as those described further below, to match the diameter of the commercially available 200/220/250 multimode fiber that is be used for the receiver optical fibers in such embodiments. In various other embodiments, the part number FS-SC-3314, made by 3M Corporation, is used. Optical fibers of this type are commercially available with $D_{SC}$=80 microns and $D_{SF}$=200 microns, providing two additional possible outer fiber diameters for an optical source fiber according to this invention. It will be appreciated that both single mode and multimode fibers can be custom made to any of a wide variety of outer diameters suitable in various exemplary embodiments according to this invention.

It should be appreciated that another advantage of single mode source fibers in various fiber optic readheads according to this invention is their relatively small numerical aperture. The associated range of illumination divergence half angles that they inherently provide, without the need for special light source fiber end processing or lenses is convenient and appropriate for various exemplary interferometric-type fiber optic readheads according to this invention. As previously discussed, in various exemplary embodiments excessive divergence angles may lead to undesirable divergence loss, that is, wasted light and reduced intensity at a receiver illumination plane according to this invention. Furthermore, as indicated by the relationship line 633 in comparison to the relationship line 623 in FIG. 8, for example, as the divergence half angle is relatively increased in some exemplary embodiments according to this invention the minimum desirable operating gap required to avoid detecting +/−$3^{rd}$ order diffraction light can increase significantly. In some applications, it is desirable to have a very compact encoder readhead mounting arrangement, and it is therefore undesirable to have a relatively increased operating gap. Accordingly, in various exemplary embodiments, a light source according to this invention provides a divergence half angle of less than 12 degrees. In various other exemplary embodiments, a light source according to this invention provides a divergence half angle of less than 10 degrees. In yet other exemplary embodiments, a light source according to this invention provides a divergence half angle of less than 8 degrees.

Figure 12:
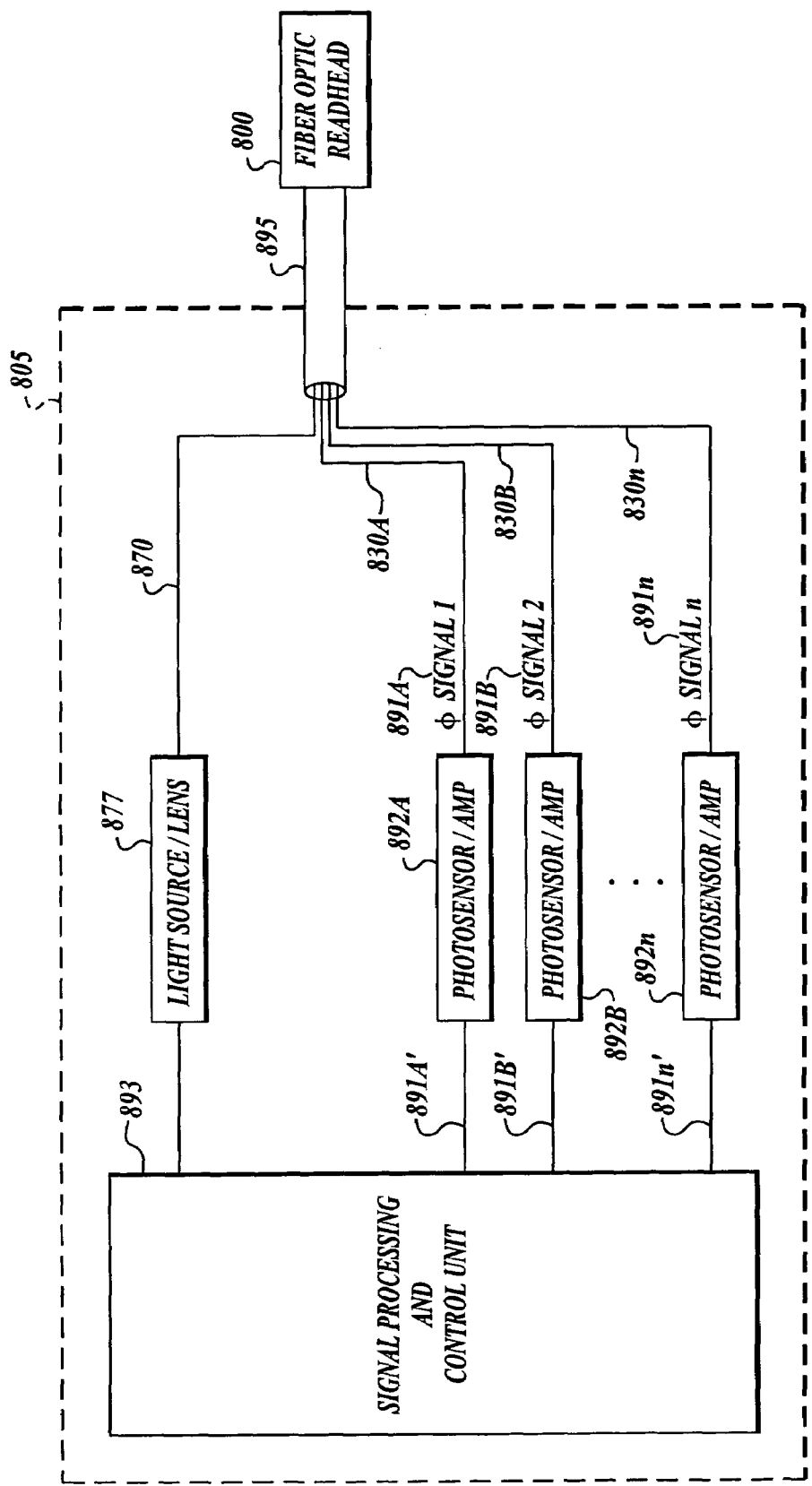
FIG. 12 shows a block diagram including a remote electronic interface unit usable in conjunction with a fiber-optic readhead according to this invention.

FIG. 12 shows a block diagram including a generic remote electronic interface unit 805 that is usable in conjunction with a fiber-optic readhead according to this invention, generically represented by a fiber-optic readhead 800. The remote electronic interface unit 805 includes a signal processing and control unit 893, a light source 877 that may include an optional lens and an embodiment-specific plurality of photosensor/amps 892A to 892n. The light source/lens 877 may include other optics such as optical isolators or the like. The light source/lens 877 and the photosensor/amps 892A to 892n are coupled to the fiber optic readhead 800 through light source optical fibers 870 and receiver optical fibers 830A to 830n, respectively. The optical fibers 870 and 830A to 830n are routed within a readhead cable 895 that gathers and protects the optical fibers between the fiber optic readhead 800 and the remote electronic interface unit 805. In various exemplary embodiments according to this invention, the readhead cable may be several meters long or more. The receiver optical fibers 830A to 830n carry the optical signals 891A to 891n, respectively. The optical signals 891A–891n are phase signals provided as describe above and further below.

Figure 13:
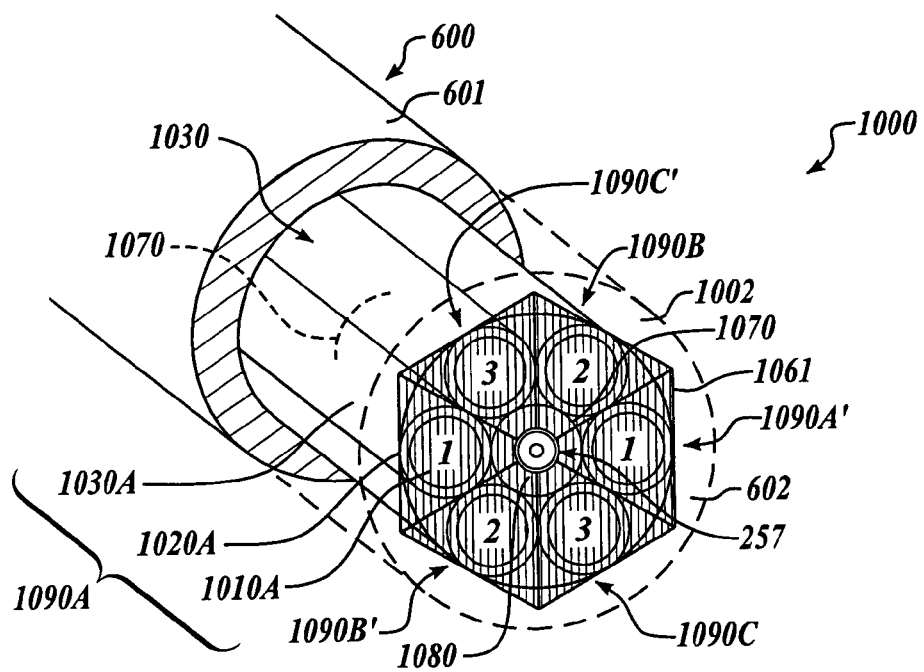
FIG. 13 is a partly orthographic, partly isometric view of a fourth embodiment of a fiber-optic readhead arrangement according to this invention.

The light source/lens 877 receives power and may receive gain control signals from the signal processing and control unit 893. As described above, the light source/lens 877 transmits light through the source optical fiber(s) 870 to the scale grating of the fiber optic readhead 800. The fiber optic detector channels, such as the fiber-optic receiver channels 190A–190C described above, or the like, receive light from the scale grating of the fiber optic readhead 800 and provide the signals 891A to 891n, which are input to the photosensor/amps 892A to 892n, respectively. The photosensor/amps 892A to 892n provide amplified electronic output signals 891A' to 891n' to the signal processing and control unit 893. It will be appreciated that in various exemplary embodiments described further below, an optical fiber readhead according to this invention may provide a plurality of optical fiber receiver channels carrying optical signals that are summed. For such embodiments, fibers carrying the optical signals that are summed can interface to the same photosensor/amp 892 in order to provide the desired signal summing, or to different photosensor/amps 892 which have their signals summed electronically during additional signal processing. Thus the FIG. 13 shows a fourth exemplary embodiment of a fiber-optic readhead arrangement 1000 according to this invention. The fiber-optic readhead arrangement 1000 operates substantially similarly to the generic fiber-optic readhead arrangement 300 described above with reference to FIG. 3 and includes components similar to those described above with reference to FIG. 9. Due to these similarities in configuration and operation, only certain aspects of the fiber-optic readhead arrangement 1000 that require additional explanation, are described below.

As shown in FIG. 13, the fiber-optic readhead arrangement 1000 includes a first set of three fiber-optic receiver channels 1090A–1090C, which operate similarly to the previously described fiber-optic receiver channels 190. It should be appreciated that the fiber-optic readhead arrangement 1000 provides a first example of a "balanced pair" fiber optic readhead according to this invention. To provide a balanced pair fiber optic readhead according to this invention, the fiber-optic readhead arrangement 1000 includes a second set of three respective balanced fiber-optic receiver channels 1090A'–1090C' that are respectively arranged in "balanced pairs" on opposite sides of the illumination field center 257 from the respective fiber-optic receiver channels 1090A–1090C as shown. The pairs of numbers 1—1, 2—2, and 3—3 shown on the optical fiber receiver apertures 1010 are indicative of the balanced pairs.

Also shown in FIG. 13 is a readhead housing 600 comprising a cylindrical ferrule 601, shown partially in dashed outlined cutaway. The inner diameter of the ferrule fits with a slight interference fit over the close-packed optical fibers 1030 and 1070. In one exemplary assembly method, the fibers are inserted and aligned in the ferrule 601 from the back end and inserted until they protrude slightly beyond a mounting surface 602. The fibers are then bonding to the ferrule and each other. The fibers are then ground and polished flush with the mounting surface 602. Then, the phase mask element 1061 is aligned to the fiber ends under a microscope and bonded tight to the mounting surface 602. In one exemplary embodiment, the phase masks 1020 are fabricated on the "inside" of the phase mask element 1061, nearest the fiber ends. The hexagonally shaped phase mask element 1061 is described in detail with reference to FIG. 14, below.

A light source 1080 is provided by the end of a source fiber 1070. In one exemplary embodiment, the source fiber 1070 is a single mode fiber used as a point source for emitting light at a source wavelength of 635 nm, and is the optical fiber part number FS-SN-3224 made by 3M Corporation, that has an outer diameter of $D_{SF}$=250 microns. The receiver optical fibers 1030 are all the same commercially available multimode fiber that is a silica fiber with 200/220/250 micron core/cladding/buffer diameters $D_{RA}/D_{RC}/D_{RF}$. Thus, all of the source and receiver fibers in the fiber-optic readhead arrangement 1000 have the same 250 micron outer diameter and can therefore be arranged in an advantageous close packing assembly arrangement according to this invention that allows both highly accurate and economical precision alignment and assembly. In this exemplary embodiment, the advantageous close packing assembly arrangement is a hexagonal close packing assembly arrangement.

It will be appreciated that in comparison to the 3-fiber receiver arrangement used in the fiber-optic readhead arrangement 500 shown in FIG. 9, the balanced 6-fiber receiver arrangement of this embodiment provides twice as much received light, and therefore twice the potential signal strength. Experimentally, the inventor has demonstrated stable position readings with a comparable readhead arrangement of this type at a resolution of 1 nanometer using a scale grating having a 4 micron grating pitch. Furthermore, the balanced pair arrangement of the receiver apertures 1010 rejects certain errors due to readhead misalignment to further increase measurement accuracy. A detailed discussion of reducing yaw related errors follows below with reference to FIG. 16.

It should be appreciated that an assembly such as the fiber-optic readhead arrangement 1000 provides a high resolution all optical encoder readhead in a diameter of 1.0 mm or less. It should be appreciated further that the arrangement provides low-cost precision "self-assembly". It should also be appreciated that the source fiber 1070 is intentionally "oversized" solely for these assembly purposes.

Figure 14:
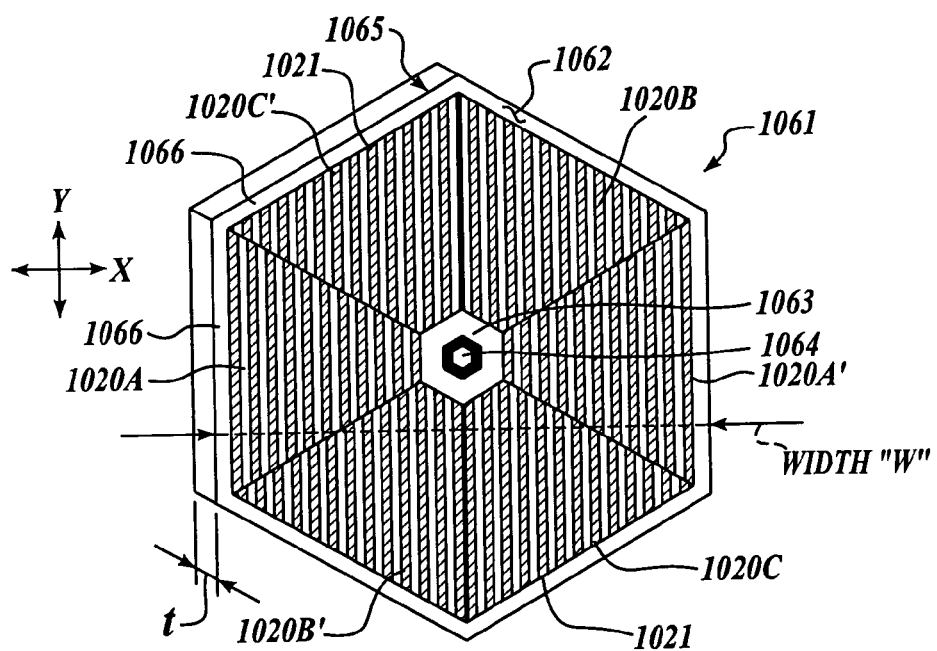
FIG. 14 shows an exemplary phase mask element usable in various fiber-optic readhead arrangements according to this invention.

FIG. 14 shows an exemplary phase mask element 1061 usable in the fiber-optic readhead arrangement 1000 and various other readhead arrangements according to this invention. The phase mask element 1061 includes the phase masks 1020A–1020C and 1020A'–1020C'. Each of the phase masks 1020 includes grating bars 1021 that are opaque to a readhead source light. The grating bars 1021 are arrayed on the surface 1062 of a substrate 1065 of nominal thickness t and nominal width w that is transparent to the readhead source light. Chrome, copper, and oxides thereof are common materials that may be used for patterning the grating bars 1021. Glass and quartz are common substrate materials that may be used for the substrate 1065. The substrate 1065 may have edge margins 1066 outside the active mask area to avoid damage to the grating bars during processing. The edge margins 1066 may vary in width around the mask area so that the substrate has hexagonal (as shown), circular, rectangular, or square shape to allow efficient scribing and/or dicing. The active mask area of each of the phase masks 1020A–1020C and 1020A'–1020C' is the area containing the grating bars 1021. This active mask area should be of sufficient size to cover the clear aperture area of the corresponding receiver apertures 1010 with extra tolerance for variations in assembly positioning. Shown at the center of the mask element 1061 is an alignment ring 1063 having a clear aperture 1064 for the source light from the optical fiber 1070, discussed above. The size of the clear aperture is, for example, several times greater than the single-mode core diameter previously described with reference to FIG. 11, which is on the order of $D_{S4}=4$ microns. In one exemplary embodiment the phase mask element 1061 is made of soda lime glass, has a thickness of 0.25 mm and a width of 2.0 mm, which overhangs the fiber arrangement described with respect to FIG. 13 by a substantial margin, for attachment to a ferrule 601 that has approximately a 2.0 mm outer diameter.

The mask grating bars 1021 are arranged periodically along the X-axis direction according to a period that matches that of the interference fringes, as previously described. The exemplary phase mask element 1061 as shown has 6 phase masks 1020 for use with 6 fiber-optic receiver channels in a balanced configuration where diametrically opposing fiber-optic receiver apertures receive the same phase of light signal modulation with x direction movement of the readhead relative to the scale. The phase masks 1020 have phases of 0 degrees (1020A and 1020A'), 120 degrees (1020B and 1020B'), and 240 degrees (1020C and 1020C'). The signal processing for the resulting signals in the corresponding fiber-optic receiver channels is discussed further below. The boundary between the various phase masks 1020 is easily visible under a microscope for a phase mask element constructed with grating bars 1021 usable in an interferometric encoder. These can be used to align the phase mask element 1061 relative to the receiver fibers. The inventor has found that alignments within tolerances less than 20 microns are easily achievable using a microscope and an XYZ micrometer stage to position the phase mask element 1061 relative to the receiver fibers.

Figure 15:
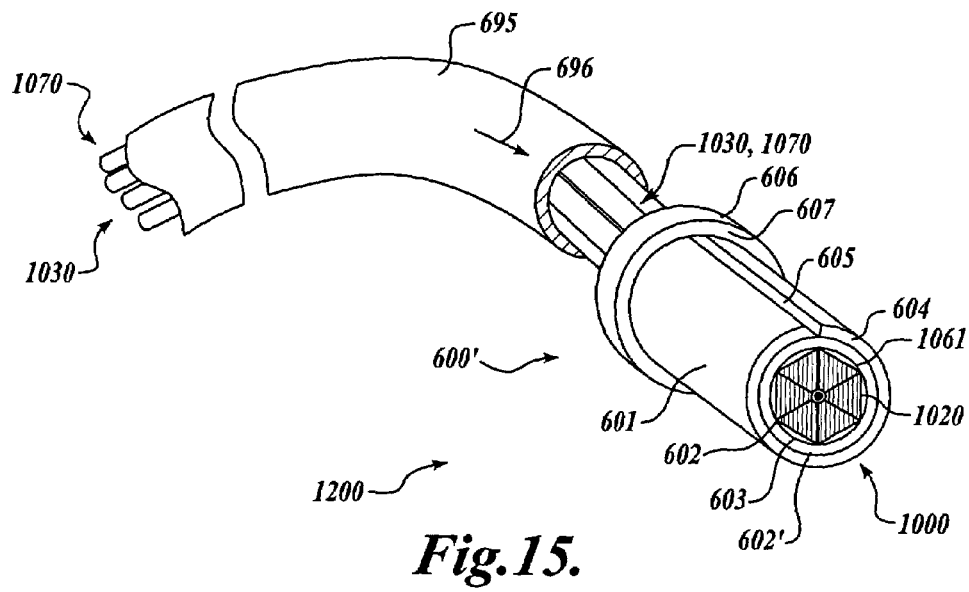
FIG. 15 shows a first exemplary embodiment of a fiber-optic readhead and cable according to this invention.

FIG. 15 shows a first exemplary embodiment of a fiber-optic readhead and cable 1200 according to this invention. The fiber-optic readhead and cable 1200 operates substantially similarly to the generic fiber-optic readhead arrangement 300 described above with reference to FIG. 3 and includes the fiber-optic readhead arrangement 1000 described with reference to FIG. 13. Due to these similarities in configuration and operation, only certain aspects of the readhead housing 600' and the cable 695 will be described below.

As shown in FIG. 15, the fiber-optic readhead and cable 1200 incorporates the "balanced pair" fiber-optic readhead arrangement 1000. The readhead housing 600' includes a ferrule 601 having an inner diameter 603, which is appropriately sized according to the close packing assembly methods previously described. The mounting surface 602 in this embodiment may be surrounded by a small extended collar, such that the phase mask element 1061 is recessed relative to an end surface 602', thus protecting the surface of the phase mask element 1061 from damage. The end surface 602' may also include a chamfer 604 so that the readhead housing 600' is easier to insert into a mounting hole. The readhead housing 600' further includes a mounting stop 606 for stopping the readhead housing 600' at the proper depth in a mounting hole, for example, to aid in establishing a desirable receiver gap. The mounting stop 606 and ferrule 601 may be a single piece or an assembly. The ferrule 601 includes an alignment groove 605, which aids mounting alignment in various applications. The alignment groove 605 is relatively precisely aligned with respect the orientation of the bars of the phase masks 1020. The optical fibers 1030 and 1070 extend from the back of the ferrule 601 and/or mounting stop 606 and into a readhead cable 695 shown in cutaway, which is a typical commercial fiber optic bundle jacket in various exemplary embodiments. As indicated by the arrow 696, the jacket of the cable 695 is inserted and bonded into an enlarged diameter at the rear of the readhead housing 600' and fixed in place by adhesive or the like to provide protection and strain relief for the various optical fibers. As previously discussed, the cable 695 may extend for tens of meters or more in various applications without appreciable signal loss.

Thus, the fiber optic readhead and cable 1200 provides a miniature fiber optic readhead usable in an industrial environment. It should be appreciated that the outer diameter of the readhead housing ferrule 601 and/or mounting stop 606 may easily be made as small as 1 to 2 mm. Thus, in one exemplary embodiment, the readhead housing 600', or a remote end of the cable 695, or both, are assembled into industry standard PM-FC connectors for further installation, mounting, alignment and connection.

Figure 16:
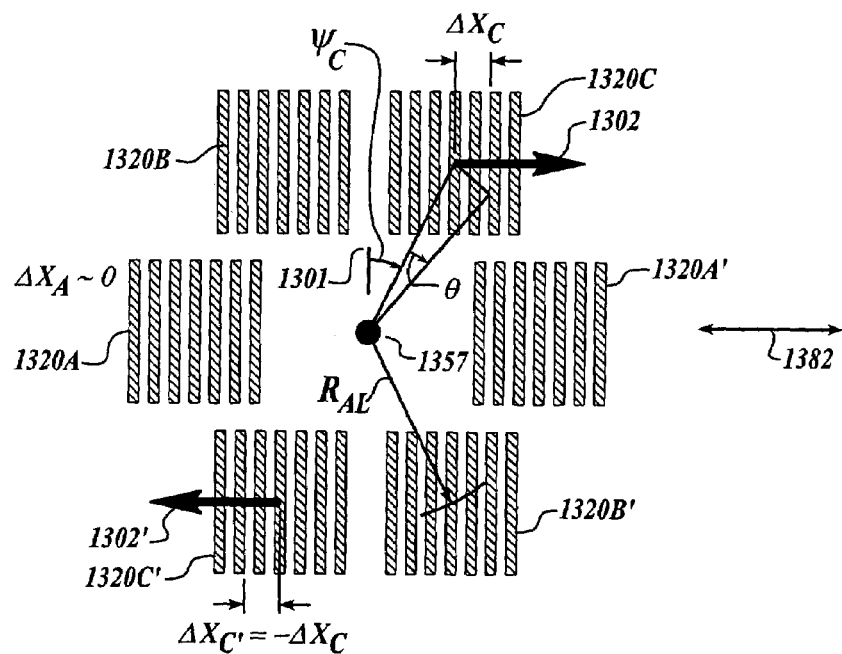
FIG. 16 is a diagram illustrating a yaw misalignment consideration relevant to various exemplary embodiments according to this invention.

FIG. 16 is a diagram illustrating a yaw misalignment consideration relevant to various exemplary embodiments according to this invention. As shown in FIG. 16, six fiber-optic receiver channels, schematically represented by the six corresponding phase masks 1320A–C and 1320A'–C', are arranged in a pattern around a nominal illumination field center 1357, similar to various exemplary embodiments discussed previously. In this example, the illumination field center 1357 is also assumed to be a rotation center 1357 of a rotational yaw misalignment, described in detail below. Each fiber-optic receiver channel is located at a receiver aperture location radius $R_{AL}$, and at a respective location angle $\Psi_i$ from the line 1301 that extends orthogonal to the measurement direction 1382 and through the rotation center 1357. For this geometry, a rotational yaw misalignment of θ will result in a respective shift of $\Delta x_i$ in the location of each phase mask 1320*i* along the direction of motion 1382. For fiber-optic receiver channel having a respective angle $\Psi_i$ and the receiver aperture location radius $R_{AL}$, the shift $\Delta x_i$ will be $$\Delta x_i = R_{AL} \theta \cos \Psi_i \quad \text{(Eq. 10)}$$

For a given yaw misalignment θ, phase masks 1320*i* located relative to the rotation center 1357 along a direction corresponding to the measurement direction 1382, such as the phase masks 1320A and 1320A', will have little or no shift ($\Delta x_A = \Delta x_D \approx 0$), while phase masks 1320*i* located relative to the rotation center 1357 along a direction parallel to the line 1301, such as the phase masks 1320B, 1320C, 1320B' and 1320C', will have a relatively large shift $\Delta x_i$. Each shift $\Delta x_i$ in a phase mask location will cause a spatial phase location error for that phase mask 1320*i* and a corresponding phase error in the signal of the corresponding fiber-optic receiver channels. Both the shift $\Delta x_i$ and the corresponding signal phase error are of the same magnitude and in opposite directions for "balanced pair" phase masks 1320*i* and 1320*i'* on opposite sides of the illumination field center/rotation center 1357, as indicated by the direction of the arrows 1302 and 1302' on the phase masks 1320C and 1320C'. Thus, when balanced pair fiber-optic receiver channels are summed, either optically or electronically, as discussed above with reference to FIG. 12, signal phase errors due to the rotational yaw misalignment θ are cancelled. Similarly, certain other signal errors due to rotational roll and pitch misalignments are cancelled when balanced pair fiber-optic receiver channels are summed. In addition, optically summing balanced pair fiber-optic receiver channels provides the further advantage of increasing signal levels without increasing electronic noise.

In one exemplary embodiment of the balanced pair fiber-optic readhead arrangement shown schematically in FIG. 16, the fiber-optic receiver channel signals corresponding to the phase masks 1320A and 1320A' can both have a nominal phase of zero degrees and can be optically summed to yield a photodetector signal $U_R$. Similarly, the fiber-optic receiver channel signals corresponding to the phase masks 1320B and 1320B' can both have a nominal phase of 120 degrees and can be optically summed to yield a photodetector signal $U_S$ and the fiber-optic receiver channel signals corresponding to the phase masks 1320C and 1320C' can both have a nominal phase of 240 degrees and can be optically summed to yield a photodetector signal $U_T$. These signals can then be processed to yield quadrature signals $Q_1$ and $Q_2$ by using the following equations:

$$Q_1 = \frac{U_T - U_S - (1 - 2\cos\alpha)(U_R - U_S)}{\cos\alpha - 1} \quad \text{(Eq. 11)}$$

$$Q_2 = \frac{U_T - U_S + (1 + 2\cos\alpha)(U_R - U_S)}{\sin\alpha} \quad \text{(Eq. 12)}$$

where α=120 degrees. It should be appreciated that in various embodiments, the value of α may be adjusted slightly during signal processing, as a calibration or compensation factor to provide compensation for various phase errors that occur due to fabrication inaccuracies and the like. Similar alternative equations may also be used. Such alternative equations allow for a different choice of phase for the three channels, as long as the relationship between the difference in phase for two of the channels (i.e., 240 degrees for channel pairs A/A' compared to channel pairs C/C') is twice the difference in phase for different sets of channels (i.e., 120 degrees for channel pairs A/A' compared to channel pairs B/B'). Therefore, an alternative set of phases that can be used for the phase masks 1320A–C and 1320A'–C' are 0, 100 and 200 degrees, although advantages in removing third harmonics from the quadrature signals are decreased with this alternative set of phases, as discussed below.

A measured readhead position X can then be determined from the foregoing quadrature signals using a two-argument arctangent function that is modulo 2π:

$$X = (P_g/2\pi) * \text{atan}(Q_1, Q_2) \quad \text{(Eq. 13)}$$

where $P_g$ is the grating pitch of a scale grating, such as the previously described scale grating 80, or the like, that is used with a fiber-optic readhead according to this invention. The two-argument "atan" function shown in EQUATION 13 is available and described in a number of publicly available mathematical programs. The function result is the arctangent of $Q_1/Q_2$, in radians. However, the use of two arguments allows the determination of the quadrant of the resulting angle, so that the result is between –pi and +pi rather than –pi/2 and +pi/2. More generally, it should be appreciated that numerous different equations can be used for converting phase signals to position measurements, as discussed further below.

In various other fiber-optic readhead embodiments that provide a set of fiber-optic receiver channel signals having four different phases, each signal differing in phase from another signal by a constant phase amount α, the Carré technique can be applied. See, for example, Gary Cloud, "Optical Methods of Engineering Analysis", Cambridge University Press, 1998, pp. 488–489, which is incorporated herein by reference for all of its relevant teachings. The Carré technique is often used in multi-wavelength interferometry, but may also be applied to phase signals provided in various exemplary embodiments according to this invention.

It should be appreciated that perfectly sinusoidal phase signals are difficult to achieve in practice, and that deviations from a perfect sinusoidal output contain spatial harmonics of the fundamental wavelength or grating pitch of a scale grating used with a fiber-optic readhead according to this invention. In particular, the dominant error content in various interferometric encoder systems often takes the form of a third spatial harmonic. Therefore, in various exemplary embodiments according to this invention, a fiber-optic encoder readhead having a three phase configuration is used. It should be appreciated that in such embodiments the third spatial harmonic error content in the various individual fiber-optic receiver channel signals can be largely eliminated as a source of position measurement error, by performing signal processing corresponding to EQUATIONS 11 and 12 in order to determine the position measurement value. At the same time, a 50% duty cycle can be used for the various phase masks.

In various other exemplary embodiments, a fiber-optic encoder readhead having a two phase or four phase configuration can be used. However, in such embodiments, it may be advantageous in various applications to use a 33% duty cycle for the various phase masks, in order to reduce residual third spatial harmonic error content to acceptable levels in the various individual fiber-optic receiver channel signals. However, in such applications this has the disadvantage of lowering signal levels slightly over the signal levels achievable when using a 50% duty cycle for the various phase masks.

In general, many alternative combinations of phases may be used in various alternative phase mask embodiments according to this invention. TABLE 2, below, lists a few examples of the various combinations of phases that are usable with the exemplary fiber-optic readhead phase mask layout shown schematically in FIG. 16. Balanced pair configurations may be used in various exemplary embodiments listed in TABLE 2, or may not be used in various other exemplary embodiments. In various other exemplary embodiments, some phase mask positions may not actively be used, but fibers may be included at such phase mask positions in the corresponding fiber-optic readhead embodiments, to act as passive spacers for assembly purposes. In general, the configurations listed in TABLE 2 are indicative of a further number of alternative configurations. For example, configurations that do not used balanced pairs may have the spatial phase values in the various phase sets permuted to any possible combination of phase mask positions, provided that appropriate signal processing is used to determine the corresponding position measurement values. Similarly, balanced pair configurations may have the balanced pairs permuted to any possible combination of phase mask positions, provided that the balanced pairs remain symmetrically located on opposite sides of the center of rotation of the configuration. Phase mask positions marked with an "x" may include dummy fibers as discussed above, or may duplicate the spatial phase of one of the other phase mask position, or even include a different spatial phase value, provided that appropriate signal processing is used to determine the corresponding position measurement values.

related to higher spatial harmonics compensated and/or removed. However, such 3 or 6 phase fiber-optic readhead configurations generally cannot compensate and/or remove the error content associated with the fifth and seventh spatial harmonics.

Figure 17:
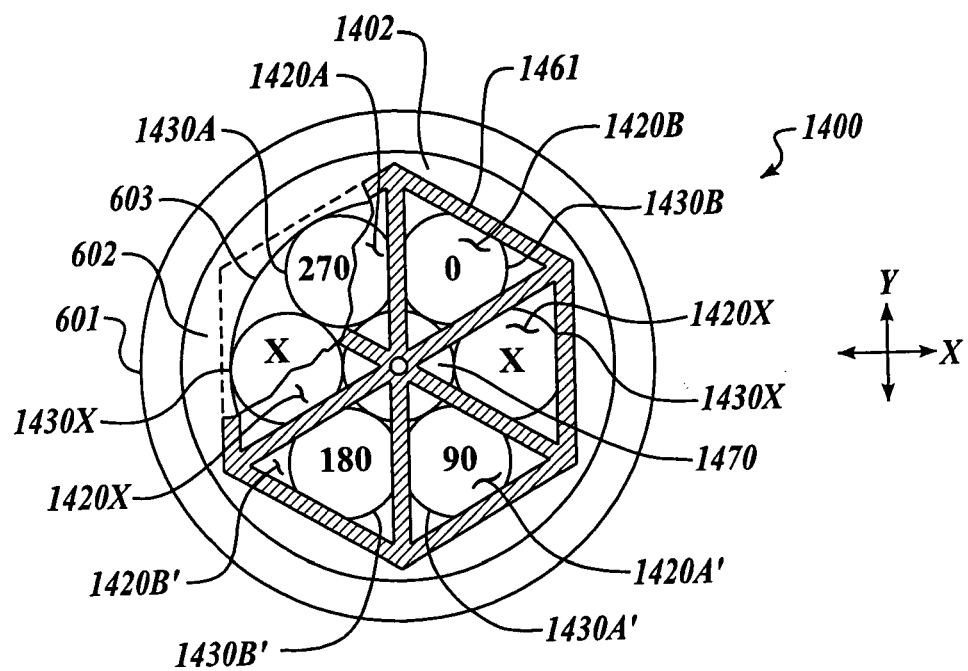
FIG. 17 shows a fifth exemplary embodiment of a fiber-optic readhead arrangement according to this invention.

FIG. 17 shows a fifth exemplary embodiment of a fiber-optic readhead arrangement 1400 according to this invention. A hexagonal phase element mask 1461 is mounted to a mounting surface 602 of a readhead housing ferrule 601 that has in inner diameter 603 that provides good alignment for 6 optical receiver fibers 1430 in a close packed arrangement surrounding one source fiber 1470, as previously described with respect to the fiber-optic readhead arrangement 1000 shown in FIG. 13. It should be appreciated that the two "receiver" fibers 1430x are dummy fibers and are used only for assembly purposes in this embodiment—serving to locate the remaining active fibers by providing a the close packing geometry. The four remaining phase masks 1420A, 1420A', 1420 B and 1420B' and respective receiver apertures and fibers are arranged to provide traditional quadrature phases signals that have relative spatial phases of 270, 90, 0 and 180 degrees, respectively, as shown. These are analyzed for position determination using an equation similar to that given in TABLE 2 for these four spatial phases, or by any other known quadrature signal processing method. The fiber-optic readhead arrangement 1400 does not include the benefits of a balanced pair fiber-optic receiver channel configuration in decreasing rotational misalignment errors, since the fiber-optic receiver channels on opposite sides of the fiber-optic readhead arrangement 1400 have their signals subtracted instead of added. Another aspect of this embodiment is the addition of opaque margins between and surrounding the various phase

TABLE 2

Phase Mask Phases; Properties & Processing with reference to FIG. 16 Layout.

| | FIG. 16 Phase Mask Position | | | | | Balanced Pair Configuration | Comments: Position Determination |
|---|---|---|---|---|---|---|---|
| | 1320A | 1320B | 1320C | 1320A' | 1320B' | 1320C' | | |
| Spatial Phase Sets Usable at Various Phase Mask Positions | 0 ($P_0$) | 90 ($P_{90}$) | 180 ($P_{180}$) | 270 ($P_{270}$) | x | x | No | $[P_g/2\pi]$ * $\tan^{-1}[(P_{180}-P_0)/(P_{270}-P_{90})]$ |
| | 0 | α | 2α | 3α | x | x | No | Carré Technique, α~π/2 |
| | 0 | 120 | 240 | x | x | x | No | Eqs. 11, 12 and 13 |
| | 0 | α | 2α | x | x | x | No | Eqs. 11, 12 and 13 |
| | 0 | 72 | 144 | 216 | 288 | x | No | 5 phase configuration |
| | 0 | 60 | 240 | 300 | 120 | 180 | Some balance effects | 6 phase configuration |
| | 0 | 120 | 240 | 0 | 120 | 240 | Yes | Eqs. 11, 12 and 13 |
| | 0 | α | 2α | 0 | α | 2α | Yes | Eqs. 11, 12 and 13 |

Position determination calculations for the five and six phase configurations shown in TABLE 2, and for greater numbers of phases usable in various exemplary embodiments according to this invention, are known to those skilled in the art and can readily be derived for an arbitrary number of phases. In various exemplary fiber-optic readheads according to this invention, a 5 phase configuration is used, which provides one advantage in that signal error content related to higher spatial harmonics up to the $9^{th}$ spatial harmonic can be compensated and/or removed. In various other exemplary fiber-optic readheads according to this invention, a 3 or 6 phase configuration is used, which provides similar advantages in that signal error content masks 1420. Such opaque margins help prevent stray light from leaking into the cladding material to inadvertently reach the photodetectors shown in FIG. 11. In addition, the margins may help prevent the spatially filtered light near the edges of adjacent phase masks from leaking into adjacent optical fiber signal channels and causing associated signal errors.

Figure 18:
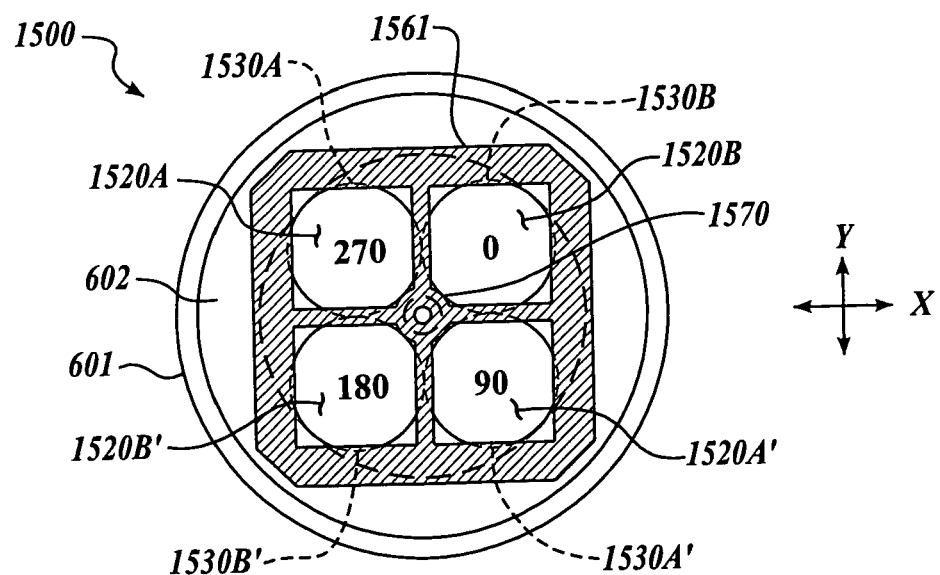
FIG. 18 shows a sixth exemplary embodiment of a fiber-optic readhead arrangement according to this invention.

FIG. 18 shows a sixth exemplary embodiment of a fiber-optic readhead arrangement 1500 according to this invention, which is constructed similarly to the fiber-optic readhead arrangement 1400, described with reference to FIG. 17. The fiber-optic readhead arrangement 1500 includes a square phase mask element 1561 mounted to a mounting surface 602 of a readhead housing ferrule 601. The mask element 1561 includes phase masks 1520A, 1520A', 1520 B and 1520B', respective receiver fibers 1530A, 1530A', 1530 B and 1530B' and a source fiber 1570, all arranged inside the readhead housing ferrule 601 to provide traditional quadrature phases signals that have relative spatial phases of 270, 90, 0 and 180 degrees, respectively, as shown. The fiber-optic readhead arrangement 1500 is a four phase embodiment similar to that shown in FIG. 17. In this case, a more efficient arrangement using fewer components is made by using dissimilar fiber diameters for the source fiber 1570 and the receiver fibers 1530A, 1530A', 1530B and 1530B'. A square "close packed" arrangement is thereby achieved for assembling the receiver fibers and the receiver aperture bounding radius $R_{CR}$ is reduced relative to that provided in the arrangement shown in FIG. 17. In various exemplary close packing embodiments using this configuration, the source fiber diameter DSF is related to the receiver fiber diameter $D_{RF}$ as follows: $D_{SF}$=0.4142 $D_{RF}$.

In general, a wide variety of alternative close-packed fiber-optic readhead configurations may be determined for a source fiber surrounded by n receiver optical fibers having an outer fiber diameter $D_{RF}$. For such close-packed fiber-optic readhead configurations, the source fiber outer diameter $D_{SF}$ is determined according to $$D_{SF} = D_{RF}\left(\frac{1}{\sin(180°/n)} - 1\right) \quad \text{(Eq. 14)}$$

Such close-packed fiber-optic readhead configurations having n receiver optical fibers packed around one source optical fiber can provide any practical number of fiber-optic receiver channels such that the receiver aperture for each channel is located at a similar radius away from the center of the arrangement. Such configurations tend to provide inherently balanced signals from the various fiber-optic receiver channels, which is a desirable feature in various exemplary embodiments according to this invention. In various exemplary embodiments, n may be increased so that some fiber-optic receiver channels may redundantly provide the same phase signals. In various exemplary embodiments, such redundant signals may be optically added to increase signal strength or decrease the effects of various misalignments or assembly tolerances or to provide other performance advantages. However, it should be appreciated that as n increases, and particularly when n becomes greater than approximately six, the appropriate outer diameter of the central source optical fiber increases and the receiver aperture bounding radius $R_{CR}$ increases, potentially reducing the compactness of a readhead and its minimum operating gap. Thus, in such cases, the various design relationships previously discussed with reference to FIG. 8 should also be considered.

In one alternative embodiment (not illustrated), by using readhead housing ferrule having a square hole to receive the various optical fibers, square packing of fibers may be used in a configuration where one source optical fiber is surrounded by eight receiver optical fibers and all of the optical fibers have the same outer diameter. For example, electric discharge machining may be used to produce a square hole of side s through a readhead housing ferrule. Nine fibers of diameter s/3 may be inserted through the hole in 3 rows of 3, the central fiber being the source fiber surrounded by 8 receiver fibers. One possible arrangement of spatial phases is a four phase balanced pair optical-fiber receiver configuration, with like spatial phases located on opposite sides of the centrally located source optical fiber. For example, the 0 and 180 degree spatial phase receiver channels can be respectively positioned along the two diagonals of the square, and the 90 and 270 degree spatial phase receiver channels can be respectively positioned along the two orthogonal directions associated with the remaining four optical fiber receiver positions. Such a four phase balanced pair optical-fiber receiver configuration provides the previously described compensation and/or removal of errors related to various rotational misalignments, as well as DC offset cancellation for the phase signals that are combined by subtraction (see TABLE 2.) As the difference between the zero and 180 degree phase signals is determined to provide for DC offset correction, it is beneficial that these optical-fiber receiver channels are located at an equal distance from the source, as provided in the description above. Similarly, since the difference between the 90 and 270 degree phase signals is determined to provide for DC offset correction, it is beneficial that these optical-fiber receiver channels are located at an equal distance from the source, as provided in the description above.

It should be appreciated that, as an alternative to increasing the number of receiver fibers surrounding a single light source, in various exemplary embodiments each of the foregoing optical fiber readhead configurations can provide a physical layout that is replicated or combined in a readhead according to this invention. As one illustrative example, the basic configuration shown in FIG. 18 can be "extended" by duplicating the entire illustrated optical fiber configuration in an adjacent location along the Y direction, that is, perpendicular to the measuring axis direction 82, to provide two sets of four receiver fibers arranged around two respective light sources across the width direction of the scale grating 80. Such a configuration can be arranged in a close packed manner in a rectangular ferrule housing, or in two "overlapping" circular bores, or the like. Furthermore, single extended phase mask element can be used for both of the two sets of four receiver fibers arranged around respective light sources. In such an extended phase mask element, the phases of the individual receiver channel phase masks can be replicated similarly to the optical fiber configurations, or, alternatively, the phases of the individual receiver channel phase masks can be "rearranged" or otherwise selected in the extended phase mask element, to provide alternative balanced pair receiver channel configurations, alternative phase signals, or the like. It should be appreciated that such extended and/or duplicated optical fiber configurations provide a high signal strength and offer additional design alternatives and advantages in various exemplary embodiments according to this invention.

Figure 19:
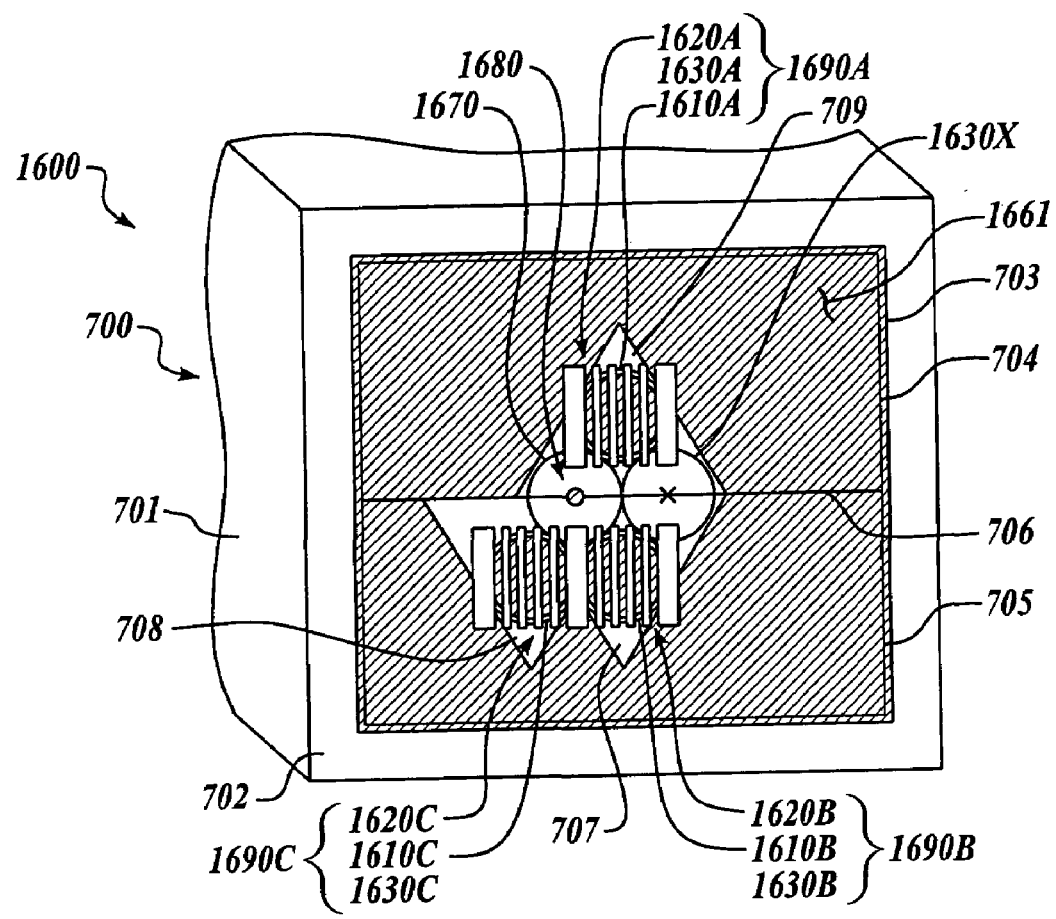
FIG. 19 shows a seventh exemplary embodiment of a fiber-optic readhead arrangement according to this invention.

FIG. 19 shows a seventh exemplary embodiment of a fiber-optic readhead arrangement 1600 according to this invention, which operates similarly to the 3 phase fiber-optic readhead arrangement 500 described above with reference to FIG. 9. Due to similarities in configuration and operation, only certain aspects of the fiber-optic readhead arrangement 1600 that require additional explanation, are described below.

As shown in FIG. 19, the fiber-optic readhead arrangement 1600 includes three fiber-optic receiver channels 1690A–1690C, which operate similarly to the previously described fiber-optic receiver channels 190. For example, the fiber-optic receiver channel 1690A includes a receiver channel aperture 1610A, a phase mask 1620A, and a receiver optical fiber 1630A (not shown). The other fiber-optic receiver channels 1690B and 1690C include similar elements that are similarly numbered. Also included is a phase mask element 1661 of a transparent material, upper V-groove alignment element 704 and lower V-groove alignment element 705, and a light source 1680 provided by the end of a source optical fiber 1670.

The phase mask element 1661 is constructed similarly to the previously discussed phase mask element 561, except the 3-phase configuration phase masks 1620A, 1620B and 1620C are respectively located over the positions of the receiver channel apertures 1610A, 1610B and 1610C, which are dictated by the V-groove 709 of the upper V-groove alignment element 704, and the V-grooves 707 and 708 of the lower V-groove alignment element 705, respectively. In various exemplary embodiments, the phase masks 1620A, 1620B and 1620C have corresponding spatial phases of 0, 120 and 240 degrees, respectively.

Also shown in FIG. 19 is a readhead housing 700 comprising a rectangular ferrule 701. The rectangular ferrule 701 fits snugly over the upper V-grooved alignment element 704 and lower V-groove alignment element 705 when they are abutted at their interface 706 and properly aligned and inserted into the rectangular hole through the rectangular ferrule 701. In one exemplary embodiment the V-groove alignment elements 704 and 705 are silicon V-groove alignment elements of the type commercially available and used for fiber optic alignment in the telecommunications industry. The V-grooves 707–709 are fabricated such that when the upper V-groove alignment element 704 and lower V-groove alignment element 705 are properly aligned and constrained within the rectangular ferrule 701, the various operating optical fibers 1670 and 1630A–C positioned within the upper and lower V-groove alignment element 704 and 705 are constrained in a close packing configuration. The benefits generally associated with such a close packing configurations have been previously described. A dummy optical fiber 1630X is included in the assembly as a convenient and economical way to constrain the other operating optical fibers 1670 and 1630A–C in their proper positions.

In one exemplary assembly method, the fibers are inserted and aligned in the upper and lower V-groove alignment elements 704 and 705, which are then lightly compressed together at the interface 706 and into the back of the rectangular hole through the rectangular ferrule 701. The various operating optical fibers 1670 and 1630A–C may protrude slightly from the front of the V-groove alignment elements 704 and 705. The various fibers and the V-groove alignment elements 704 and 705 are then bonded to the ferrule 701 and to each other. The various fibers are then ground and polished flush with the front surfaces of the V-groove alignment elements 704 and 705. Then, the phase mask element 1661 is aligned to the fiber ends under a microscope and bonded tight to the front surfaces of the V-groove alignment elements 704 and 705 and/or the ferrule 701. In one exemplary embodiment, the phase masks 1020 are fabricated on the "inside" of the phase mask element 1661, nearest the fiber ends. Despite the fact that the fiber-optic readhead arrangement 1600 is not fully radially symmetric, the overall design and dimensioning and positioning of the readhead, including the location of the receiver channel apertures 1610A, 1610B and 1610C relative to the light source provided by the source optical fiber 1670, still generally follow the teachings and design principles previously discussed with respect to FIGS. 6, 7, and 8 in various exemplary embodiments. It should be appreciated that an assembly such as the fiber-optic readhead arrangement 1600 provides a high resolution all optical encoder readhead with overall width and height dimensions on the order of two to three millimeters or less. It should be appreciated further that the arrangement provides low-cost precision "self-assembly". It should also be appreciated that the source fiber 1670 is intentionally "oversized" and a dummy optical fiber is included, solely for these assembly purposes.

Figure 20A:
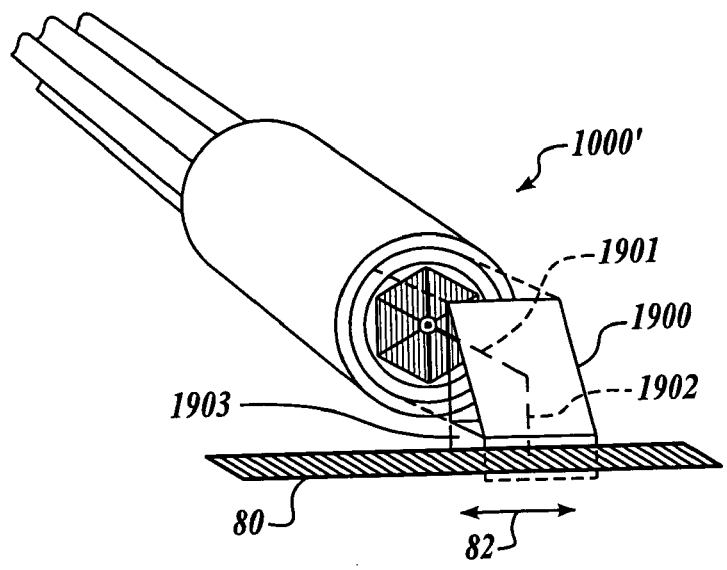
FIG. 20A shows an optical deflector usable in conjunction with various fiber-optic readheads according to this invention in a first orientation relative to a scale grating.

FIG. 20A shows an optical deflector 1900 usable in conjunction with various fiber-optic readheads according to this invention, in a first orientation relative to a scale grating 80. As shown in FIG. 20A, an exemplary optical fiber readhead 1000', similar to the optical fiber readhead arrangement 1000 previously described with reference to FIG. 13, transmits a diverging source light generally along a beam path 1901 to the optical deflector 1900, where it is deflected along a beam path 1902 through an operating gap in the zone 1903 towards a scale grating 80. Similarly, scale light reflecting, diverging and diffracting from the a scale grating 80 is returned to the optical deflector 1900 generally along the beam path 1902 and deflected back towards the readhead 1000' generally centered along the nominal beam path 1901. The scale grating 80 moves relative to the optical fiber readhead 1000' along the measuring axis direction 82. The returned scale light provides interference fringes at a receiver plane in an interference illumination field that is generally centered with respect to the fiber-optic receiver channel configuration of the exemplary optical fiber readhead 1000', as previously described with reference to various other exemplary embodiments according to this invention. It should be appreciated that the grating bars of the phase masks of the exemplary optical fiber readhead 1000' are oriented such that they are parallel to the interference fringe lines in the interference illumination field. It should also be appreciated that the more accurately the deflector 1900 deflects the beam path 1901 relative to a nominal deflection of 90 degrees to become the beam path 1902, and the more accurately the beam path 1902 is made normal to the surface of the scale grating 80, the more accurate and robust will be the resulting position measurement system.

In various exemplary embodiments, the deflector 1900 is a reflecting right angle prism, mirror, or other suitable optical component reliably mounted on a separate member in a fixed relation relative to a fiber optic readhead according to this invention. In order to maintain a compact and practical operating gap relative to the scale grating 80 in the zone 1903, the deflector 1900 is preferably mounted as close as possible to the readhead 1000'. In various exemplary embodiments, the deflector 1900 is properly aligned and attached directly to the readhead 1000'. In various other exemplary embodiments, the deflector 1900 may also act as a substrate to provide a phase mask element according to this invention, having phase masks according to this invention formed directly onto the surface of the deflector 1900 that is positioned towards the readhead 1000'.

In the embodiment shown in FIG. 20A, the optical fiber readhead 1000' is oriented with its long axis transverse to the direction of the measuring axis 82 of the scale grating 80. Either the readhead 1000' or the scale grating 80 may be fixed in position, with the other element moveable. It should be appreciated that it numerous applications it is practical to use of a deflector such as the exemplary deflector 1900 in this manner because of the ultra-miniature size of a fiber optic readhead and encoder according to this invention. It should be appreciated that in numerous applications a deflector such as the exemplary deflector 1900 further enhances the utility of a fiber optic readhead and encoder according to this invention by allowing the fiber optic readhead to be flexibly oriented relative to the scale grating 80 and the measuring axis direction 82, such that the largest and narrowest dimensions of the readhead are oriented in desired directions. It will also be appreciated that use of a deflector such as the exemplary deflector 1900 is beneficial for orienting the route of the optical fibers and/or cables of the readhead 1000'in desired directions.

Figure 20B:
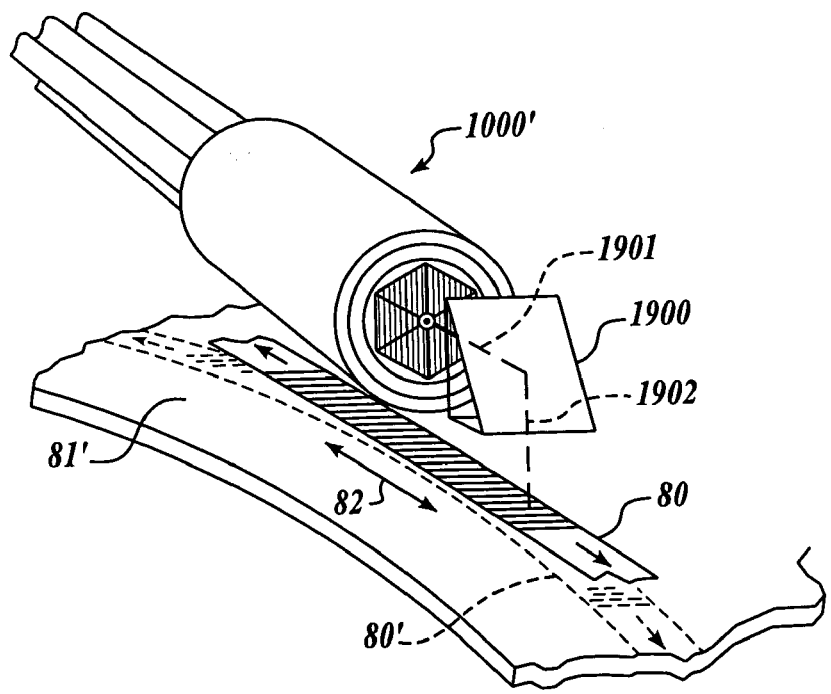
FIG. 20B shows an optical deflector usable in conjunction with various fiber-optic readheads according to this invention in a second orientation relative to exemplary scale gratings.

FIG. 20B shows the optical deflector 1900 used in a second orientation relative to two alternative exemplary scale gratings 80 and 80'. In the second orientation described below, the operation, design considerations, benefits and various alternative embodiments of the optical deflector 1900 are generally the same as previously described with reference to FIG. 20A. However, for this second orientation, the optical fiber readhead 1000' is oriented with its long axis aligned generally parallel to the direction of the measuring axis 82 of the scale grating 80. It should be appreciated that in this second orientation the grating bars of the phase masks of the exemplary optical fiber readhead 1000' are again oriented such that they are parallel to the grating lines in the interference fringes. Thus, relative to the first orientation shown in FIG. 20A, the readhead 1000' is rotated 90 degrees about its long axis, that is, about the axis of the path 1901. This second orientation further enhances the utility of the optical fiber readhead 1000' by allowing the flexibility to orient the largest and narrowest dimensions of the optical fiber readhead 1000', and/or its optical fibers and/or cables, in yet other desired directions in various applications.

FIG. 20B also shows an alternative scale grating 80', usable with a variety of optical fiber readheads according to this invention. The scale grating 80' is similar to the scale grating 80, and its measuring axis 82 is the similarly aligned. However, the scale grating 80' forms a "cylindrical" scale conforming to the surface of a cylindrical scale member 81'. It should be appreciated that the curvature of the cylindrical scale grating 80' may slightly disturb the accuracy of the interference fringes arising from the scale grating 80', and therefore degrade the measuring accuracy to some extent. However, it should be further appreciated that in various exemplary embodiments, the illumination spot on the cylindrical scale grating 80' is quite small, and the resulting interference fringes are still adequate for many practical applications. In particular, in various exemplary embodiments a cylindrical scale grating 80' having a small grating pitch such as 4 microns and having a cylinder diameter of approximately 25 mm or more, can provide measurement performance comparable to a similar flat scale grating when used with an optical fiber readhead according to this invention. The cylindrical scale grating 80' may be use in conjunction with the optical deflector 1900 or, more generally, as a substitute for any flat scale 80 usable with any other embodiment of an optical fiber readhead shown or described herein.

Figure 21:
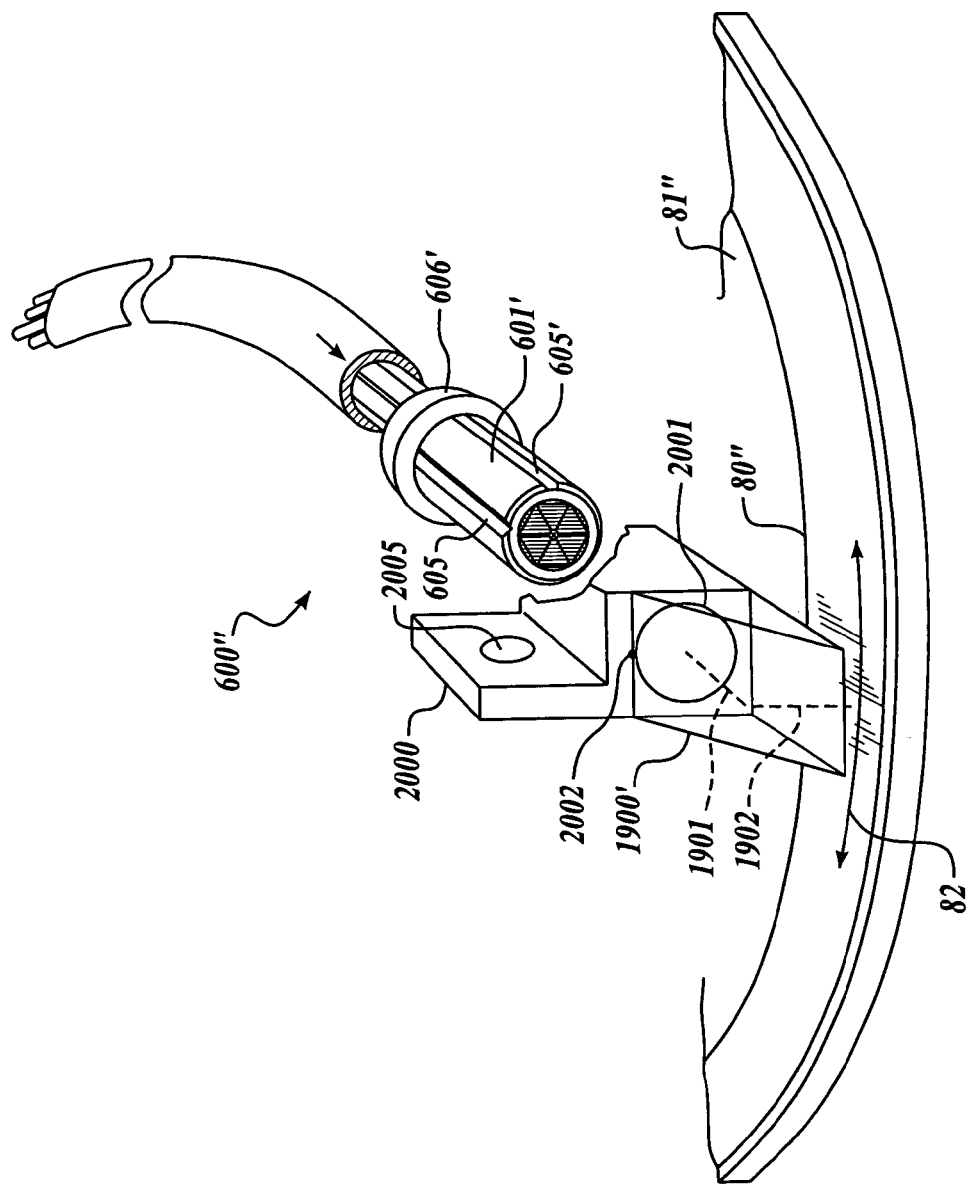
FIG. 21 shows a mounting bracket and optical deflector usable in conjunction with various fiber-optic readheads according to this invention, arranged in a first orientation relative to a rotary scale grating.

FIG. 21 shows a mounting bracket 2000 and an optical deflector 1900' usable in conjunction with various fiber-optic readheads according to this invention, arranged in a first orientation relative to a rotary scale grating 80". FIG. 21 shows a configuration including an exemplary optical fiber readhead 600" similar in to the optical fiber readhead 600' previously described with reference to FIG. 15. The exemplary readhead 600' includes a readhead housing 601' that is the same as the readhead housing 601 shown in FIG. 15, except an additional alignment groove 605' has been added at a position rotated by 90 degrees relative to the alignment groove 605. The ultra-miniature size of exemplary readhead 600' allows for a very efficient mounting scheme, where the readhead 600' can be economically mounted and the effort and time required for adequate alignment relative to the rotary scale grating 80" is minimal.

As shown in FIG. 21 the mounting bracket 2000 includes a fastener hole 2005, a bore 2001, and an alignment ridge 2002. The bore 2001 is sized to provided a snug fit for the diameter of the readhead housing 601'. The alignment ridge 2002 extends the length of the bore 2001 and is aligned and sized to mate with either of the alignment grooves 605 or 605'. The bore 2001 and/or alignment ridge 2002 may be formed during an extrusion process used to fabricate the mounting bracket 2000. Alternatively, the bore 2001 and/or alignment ridge 2002 may be drilled and/or broached, and the alignment ridge may be provided by the addition of an appropriately sized dowel or drill blank in a suitable located groove along the bore 2001.

In various exemplary embodiments, the optical deflector 1900' is similar to, or the same as, the optical deflector 1900, previously described. In various exemplary embodiments, the optical deflector 1900' may be properly aligned and attached directly to the mounting bracket 2000, approximately as shown in FIG. 21.

Similarly to the previously described configuration shown in FIG. 20A, the grating bars of the phase masks of the exemplary optical fiber readhead 600" should be oriented such that they are nominally parallel to the grating lines in the interference fringes arising from the rotary scale grating 80". Thus, for this first orientation as illustrated in FIG. 21, the alignment groove 605 is aligned with the alignment ridge 2002, and the exemplary optical fiber readhead 600" is inserted into the bore 2001 to provide the desired mounting alignment. In various exemplary embodiments, the readhead 600" is inserted until it abuts the optical deflector 1900'. In various other exemplary embodiments, the length of the mounting bracket 2000 and the location of a mounting stop 606' are chosen such that the readhead 600" is inserted until the mounting stop 606' abuts a rear surface of the mounting bracket 2000 and a minimal gap is provided between the phase mask element of the readhead 600" and the optical deflector 1900'. Once inserted, in various exemplary embodiments, in various exemplary embodiments, the readhead 600" may be permanently or temporarily rigidly fixed relative the mounting bracket 2000 by an adhesive or a mechanical fastening method.

In a second orientation relative to the scale grating 80", not illustrated, the optical fiber readhead 600" is oriented with its long axis aligned generally parallel to the direction of the measuring axis 82 of the rotary scale grating 80", and the mounting bracket 2000 is correspondingly rotated about an axis that would be vertical in FIG. 21, such that the bore 2001 is generally parallel to the direction of the measuring axis 82 of the rotary scale grating 80". Similarly to the previously described configuration shown in FIG. 20B, the grating bars of the phase masks of the exemplary optical fiber readhead 600" should be oriented such that they are nominally parallel to the grating lines in the interference fringes arising from the rotary scale grating 80". Thus, for this second orientation, the other alignment groove 605' is aligned with the alignment ridge 2002, and the exemplary optical fiber readhead 600" is inserted into the bore 2001 to provide the desired mounting alignment. Thus, relative to the first orientation relative to the rotary scale grating 80" shown in FIG. 21, the readhead 600" is rotated 90 degrees about its long axis, that is, about the axis of the path 1901.

A mounting bracket such as the exemplary mounting bracket 2000, used in conjunction with the miniature optical fiber readhead 600', provides a very efficient and versatile mounting scheme, where the readhead 600' can be economically mounted in at least two different orientations and the effort and time required for adequate alignment relative to the rotary scale grating 80" is minimal. It should be appreciated that the mounting bracket 2000 is not limited to use with rotary scale grating configurations. It is also usable in conjunction with any other scale grating configuration shown or described herein.

It should be appreciated that the curvature of the rotary scale grating 80" may slightly disturb the accuracy of the interference fringes arising from the rotary scale grating 80", and therefore degrade the measuring accuracy to some extent. However, it should be further appreciated that in various exemplary embodiments, the illumination spot on the rotary scale grating 80" is quite small, and the resulting interference fringes are still adequate for many practical applications. In particular, in various exemplary embodiments a rotary scale grating 80" having a small grating pitch such as 8 microns and having a diameter of approximately 25 mm or more, can provide measurement performance comparable to a similar straight scale grating when used with an optical fiber readhead according to this invention. The rotary scale grating 80" may be use in conjunction with the optical deflector 1900' as shown or, more generally, as a substitute for any straight scale 80 usable with any other embodiment of an optical fiber readhead shown or described herein.

With regard to FIGS. 20A, 20B and 21, and their related description, it should be appreciated that the structure of the optical fiber readheads 1000' and 600", the deflectors 1900 and 1900', and the mounting bracket 2000, have been illustrated and described in a simple form, to facilitate clear illustration and clear explanation of their basic utility and operation. However, it should be appreciated that various kinematic mounting, interface, and assembly features (not shown) may be incorporated into any one or more of the optical fiber readheads 1000' and 600", the deflectors 1900 and 1900', and the mounting bracket 2000, to facilitate proper alignment, attachment and mounting according to known kinematic mounting, interface and assembly principles.

While this invention has been described in conjunction with the exemplary embodiments outlined above, it is evident that the embodiments and design factors described above are indicative of additional alternative embodiments, modifications and variations, as will be apparent to those skilled in the art. For example, although the foregoing discussion emphasizes configurations that direct the $+/-3^{rd}$ diffraction order light away from the receiver channel apertures, in order to provide the most ideal sinusoidal output signals and the highest related accuracy in various embodiments, it will be appreciated by one of ordinary skill in the art that the intensity of the light included in $3^{rd}$ diffraction orders is much less than the intensity of the light of the $1^{st}$ diffraction orders that give rise to the interference light that is detected according to the principles of this invention. Thus, it will be appreciated that in various embodiments for certain applications, an interferometric fiber optic readhead according to this invention may be designed and/or operably positioned according to design tradeoffs such that $+/-3^{rd}$ order diffraction light is allowed to reach the receiver channel apertures. In various such embodiments that provide 3-phase optical signal outputs, it will be appreciated that various signal processing methods previously outlined can substantially reduce any $3^{rd}$ harmonic errors associated with the $+/-3^{rd}$ order diffraction light. In various other embodiments, while the potential accuracy of such designs may be relatively limited, such embodiments may still provide substantial benefits such as miniature readhead dimensions and all-optical output signals, according to the principles of this invention. Accordingly, the embodiments of the invention, as set forth above, are intended to be illustrative, not limiting. Various changes may be made without departing from the spirit and scope of the invention.

The embodiments of the invention in which an exclusive property or privilege is claimed are defined as follows:

1. A device for measuring the relative displacement between two members, the device comprising:
- a scale having a scale grating pattern formed along a measuring axis direction; and
- a fiber optic readhead arrangement positionable relative to the scale grating pattern to provide an operable interference illumination field arising from light diffracted by the scale grating pattern, wherein the interference illumination field comprises respective light and dark interference fringe zones that extend along a direction approximately perpendicular to the scale grating pattern, the fiber optic readhead arrangement comprising:
  - a plurality of fiber-optic receiver channels, each respective fiber-optic receiver channel comprising:
    - a respective receiver channel spatial phase mask portion having a respective spatial phase and having its light-blocking elements arranged at a pitch that is operable for spatially filtering the light of the operable interference illumination field, the respective receiver channel spatial phase mask portion generally located at a nominal receiver plane that is operable for spatially filtering the light of the operable interference illumination field; and
    - at least one respective receiver channel optical fiber having an input end that receives a respective receiver channel optical signal light;
- wherein:
- the respective receiver channel optical signal light received by the at least one respective receiver channel optical fiber comprises optical signal light collected through the respective receiver channel spatial phase mask portion over a respective collected light area having a collected light area dimension along the measuring axis direction that is at least one full period of the respective receiver channel spatial phase mask portion;
- when the readhead is operably positioned relative to the scale grating pattern at least first and second respective channels of the plurality of fiber-optic receiver channels spatially filter their respective portions of the light of the operable interference illumination field at the nominal receiver plane to provide at least first and second respective receiver channel optical signals having at least first and second respective signal phases; and
- the device outputs the at least first and second respective receiver channel optical signals along respective optical fibers to provide relative displacement measurement information in the form of a plurality of respective optical output signals, the respective optical output signals produced without the use of an electronic photodetector element.

2. The device of claim 1, wherein the fiber optic readhead arrangement comprises a transparent mask substrate and each respective receiver channel spatial phase mask portion is fabricated on a surface of the transparent mask substrate with its light-blocking elements positioned along the measuring axis direction with respect to the light-blocking elements of the other receiver channel spatial phase mask portions in a manner that establishes desired relationships between the respective spatial phases of the respective receiver channel spatial phase mask portions.

3. The device of claim 2, wherein the input end of each respective receiver channel optical fiber is nominally positioned against the corresponding respective receiver channel spatial phase mask portion on the surface of the transparent mask substrate.

4. The device of claim 1, wherein:
the fiber optic readhead arrangement has an optical axis;
each fiber-optic receiver channel has a respective nominal light-carrying area corresponding to an aggregate light-carrying core area of the at least one respective receiver channel optical fiber, the respective nominal light-carrying area proximate to the input end of the at least one respective receiver channel optical fiber having a respective nominal centroid; and
at least three respective fiber-optic receiver channels of the plurality of fiber-optic receiver channels each have a respective nominal centroid that is separated from the optical axis by a nominal respective location radius that is approximately the same for each of the at least three respective fiber-optic receiver channels.

5. The device of claim 4, wherein:
a central optical fiber is positioned approximately concentrically with the optical axis, at least proximate to an end of the central optical fiber, and the central optical fiber comprises a single mode source optical fiber that emits radiation having an operable wavelength from a light-carrying core area at the end of the source optical fiber; and
the at least three respective fiber-optic receiver channels are positioned substantially against the central fiber at least proximate to the input ends of the respective receiver channel optical fibers and proximate to the end of the central optical fiber.

6. The device of claim 1, wherein the plurality of fiber-optic receiver channels comprise at least 2N respective fiber-optic receiver channels arranged in an arrangement of N operable pairs, where N is an integer equal to at least 2, each operable pair comprising two respective fiber-optic receiver channels arranged on opposite sides of a center of the arrangement of N operable pairs, wherein the two respective spatial phase mask portions corresponding to those two respective fiber-optic receiver channels have one of a) the same spatial phase and b) spatial phases that nominally differ by 180 degrees.

7. The device of claim 1, wherein at least each collected light area and each input end are positioned entirely within a cylindrical volume having an axis perpendicular to the nominal receiver plane and having a cylinder radius that is at most 3 millimeters.

8. The device of claim 7, wherein the readhead arrangement has a cylinder radius containing at least each collected light area and input end which is at most 2.0 millimeters.

9. The device of claim 8, wherein the cylinder radius containing at least each collected light area and input end is at most 1.25 millimeters.

10. The device of claim 7, wherein the respective collected light area is at least partially determined by at least one of a) an aggregate light-carrying core area proximate to the input end of the corresponding at least one respective receiver channel optical fiber, b) a light receiving area of a miniature lens positioned proximate to the respective receiver channel spatial phase mask portion and proximate to the input end of the at least one respective receiver channel optical fiber and c) a limiting aperture feature of the respective receiver channel spatial phase mask portion.

11. The device of claim 7, wherein the fiber optic readhead arrangement is designed such that for at least one operable position relative to the scale grating pattern, any light arising from the $+/-3^{rd}$ diffraction orders arising from the scale grating pattern falls outside of the cylinder radius at the nominal receiver plane.

12. The device of claim 11, wherein the at least one operable position relative to the scale grating pattern corresponds to an operating gap of at most 5 millimeters.

13. The device of claim 11, wherein the at least one operable position relative to the scale grating pattern corresponds to an operating gap of at most 2.5 millimeters.

14. The device of claim 11, wherein the fiber optic readhead arrangement is designed such that any light potentially arising from the $+/-3^{rd}$ diffraction orders is evanescent.

15. The device of claim 1, wherein the fiber optic readhead arrangement includes a housing element that surrounds at least the optical fibers of the fiber optic readhead arrangement over a portion of their length proximate to their ends, the housing element has a relatively longer outer dimension in a length direction parallel to the axis of the optical fibers and relatively narrower outer dimensions in directions perpendicular to the axis of the optical fibers over at least a portion of its length, and the fiber optic readhead arrangement is constructed such that at least a portion of the length of the housing element can be inserted into a bore having a dimension perpendicular to its central axis that is at least as small as 5.0 millimeters.

16. The device of claim 15, wherein at least a portion of the length of the housing element can be inserted into a bore having a dimension perpendicular to its central axis that is at least as small as 2.5 millimeters.

17. The device of claim 16, wherein the fiber optic readhead arrangement is assembled into an orientation-maintaining connector that is mechanically interchangeable with at least one standard commercially available polarization-maintaining optical fiber connector.

18. The device of claim 1, wherein when there is relative displacement between the fiber optic readhead arrangement and scale grating pattern along the measuring axis direction, each respective optical output signal comprises a sinusoidal function of the relative displacement, and each such sinusoidal function varies from an ideal sinusoidal function by at most $1/16$ of the peak-to-peak variation of each such sinusoidal function.

19. The device of claim 18, wherein each such sinusoidal function varies from an ideal sinusoidal function by at most $1/32$ of the peak-to-peak variation of each such sinusoidal function.

20. The device of claim 1, wherein the fiber optic readhead arrangement is located on a first side of the scale grating pattern, the scale grating pattern includes transparent elements that transmit transmitted light arising on a second side of the scale grating pattern, and the operable interference illumination field arises from transmitted light.

21. The device of claim 1, wherein the fiber optic readhead arrangement is located entirely on a first side of the scale grating pattern, the scale grating pattern is at least partially reflective to reflect diffracted light arising on the first side of the scale grating pattern, and the operable interference illumination field arises from reflected diffracted light.

22. The device of claim 1, wherein the fiber optic readhead arrangement includes at least one source of light, each respective source of light comprising one of a) an electronic solid-state light source element, at least a portion of the solid-state light source element generating the light, and b) an output end of a source optical fiber, the source optical fiber connectable, to a remote light source that generates the light.

23. The device of claim 1, wherein each respective collected light area has a collected light area dimension along the measuring axis direction that is at least three full periods of the respective receiver channel spatial phase mask portion.

24. The device of claim 23, wherein each respective collected light area has a collected light area dimension along the measuring axis direction that is at least six full periods of the respective receiver channel spatial phase mask portion.

25. The device of claim 1, further comprising a reflective surface, wherein:
the fiber optic readhead arrangement has an optical axis and the reflective surface is arranged at a location along the optical axis between the nominal receiver plane and the scale grating pattern such that the reflective surface effectively deflects the optical axis by approximately 90 degrees; and
the fiber optic readhead arrangement and reflective surface are arranged relative to the scale grating pattern such that the nominal receiver plane is nominally perpendicular to the plane of the scale grating pattern.

26. The device of claim 1, wherein the scale comprises one of a) a generally planar member wherein the scale grating pattern is formed along a measuring axis direction that follows a straight line on the planar member, b) a generally planar disk-like member wherein the scale grating pattern is formed along a measuring axis direction that follows a circular path on the disk-like member, c) a generally cylindrical member wherein the scale grating pattern is formed along a measuring axis direction that follows a circular path around the cylindrical member, and d) a generally linear tape-like member wherein the scale grating pattern is formed along a measuring axis direction that follows a relatively longer axis of the tape-like member.

27. The device of claim 1, wherein the fiber optic readhead arrangement is in a transmissive configuration such that the operable interference illumination field arises from transmitted light.

28. A method for operating a device for measuring the relative displacement between two members, the device comprising:
a scale having a scale grating pattern formed along a measuring axis direction; and
a fiber optic readhead arrangement positionable relative to the scale grating pattern to provide an operable interference illumination field arising from light diffracted by the scale grating pattern, wherein the interference illumination field comprises respective light and dark interference fringe zones that extend along a direction approximately perpendicular to the scale grating pattern, the fiber optic readhead arrangement comprising:
a transparent mask substrate; and
a plurality of fiber-optic receiver channels, each respective fiber-optic receiver channel comprising:
a respective receiver channel spatial phase mask portion having a respective spatial phase and having its light-blocking elements arranged at a pitch that is operable for spatially filtering the light of the operable interference illumination field, the respective receiver channel spatial phase mask portion generally located at a nominal receiver plane that is operable for spatially filtering the light of the operable interference illumination field; and
at least one respective receiver channel optical fiber having an input end that receives a respective receiver channel optical signal light;

wherein:
each respective receiver channel spatial phase mask portion is fabricated on a surface of the transparent mask substrate with its light-blocking elements positioned along the measuring axis direction with respect to the light-blocking elements of the other receiver channel spatial phase mask portions in a manner that establishes desired relationships between the respective spatial phases of the respective receiver channel spatial phase mask portions;
the respective receiver channel optical signal light received by the at least one respective receiver channel optical fiber comprises light arising from the scale grating pattern and collected through the respective receiver channel spatial phase mask portion over a respective collected light area having a collected light area dimension along the measuring axis direction that is at least three full periods of the respective receiver channel spatial phase mask portion; and
at least each collected light area and each input end are positioned entirely within a cylindrical volume having an axis perpendicular to the nominal receiver plane and having a cylinder radius that is at most 5 millimeters;
the method comprising:
operably positioning the fiber optic readhead arrangement relative to the scale grating pattern;
receiving the light of the operable interference illumination field at the nominal receiver plane with at least first and second respective channels of the plurality of fiber-optic receiver channels and spatially filtering respective portions of the light of the operable interference illumination field to provide at least first and second respective receiver channel optical signals having at least first and second respective signal phases; and
outputting the at least first and second respective receiver channel optical signals along respective optical fibers to provide relative displacement measurement information in the form of a plurality of respective optical output signals, the respective optical output signals arising from spatially filtered scale light without the use of an electronic photodetector element.

29. The method of claim 28, wherein operably positioning the fiber optic readhead arrangement relative to the scale grating pattern comprises positioning the fiber optic readhead arrangement relative to the scale grating pattern such that any light arising from the $+/-3^{rd}$ diffraction orders arising from the scale grating pattern falls. outside of each respective collected light area.

30. The method of claim 29, wherein the operably positioned fiber optic readhead arrangement is located entirely on a first side of the scale grating pattern, the scale grating pattern reflects diffracted light arising on the first side of the scale grating pattern, and receiving the light of the operable interference illumination field at the nominal receiver plane comprises receiving reflected diffracted light arising on the first side of the scale grating pattern.

31. The device of claim 30, the fiber optic readhead arrangement further comprising at least one respective source of light, the method further comprising emitting light from the fiber optic readhead arrangement to illuminate the scale grating pattern such that the reflected diffracted light arising on the first side of the scale grating pattern comprises light that is originally emitted from the fiber optic readhead arrangement.

* * * * *

UNITED STATES PATENT AND TRADEMARK OFFICE
CERTIFICATE OF CORRECTION

PATENT NO. : 7,126,696 B2  Page 1 of 1
APPLICATION NO. : 10/674619
DATED : October 24, 2006
INVENTOR(S) : J.D. Tobiason It is certified that error appears in the above-identified patent and that said Letters Patent is hereby corrected as shown below:

| COLUMN | LINE | ERROR |
|---|---|---|
| 42 | 66 | after "connectable" delete "," |
| 44 | 46 | after "falls" delete "." |

Signed and Sealed this

Seventh Day of August, 2007

JON W. DUDAS
*Director of the United States Patent and Trademark Office*